(12) United States Patent
McTaggart-Cowan et al.

(10) Patent No.: US 10,167,786 B2
(45) Date of Patent: Jan. 1, 2019

(54) METHOD AND SYSTEM FOR OPERATING GASEOUS-FUELLED DIRECT INJECTION INTERNAL COMBUSTION ENGINE

(71) Applicant: Westport Power Inc., Vancouver (CA)

(72) Inventors: Gordon P. McTaggart-Cowan, Vancouver (CA); Kenneth R. Mann, Vancouver (CA); Jian Huang, Richmond (CA); Sandeep Munshi, Delta (CA)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 15/127,774

(22) PCT Filed: Mar. 19, 2015

(86) PCT No.: PCT/CA2015/050204
§ 371 (c)(1),
(2) Date: Sep. 20, 2016

(87) PCT Pub. No.: WO2015/139134
PCT Pub. Date: Sep. 24, 2015

(65) Prior Publication Data
US 2017/0130657 A1 May 11, 2017

(30) Foreign Application Priority Data
Mar. 21, 2014 (CA) ..................... 2847630

(51) Int. Cl.
*F02D 19/02* (2006.01)
*F02D 35/02* (2006.01)
(Continued)

(52) U.S. Cl.
CPC ......... *F02D 19/022* (2013.01); *F02D 19/024* (2013.01); *F02D 35/023* (2013.01);
(Continued)

(58) Field of Classification Search
CPC ...... F02D 19/022; F02D 41/38; F02D 19/024; F02D 41/0027; F02D 41/0052;
(Continued)

(56) References Cited

U.S. PATENT DOCUMENTS 4,742,801 A * 5/1988 Kelgard .................... F02B 3/00
123/27 GE
6,912,992 B2 7/2005 Ancimer et al.
(Continued)

FOREIGN PATENT DOCUMENTS

CA 2626995 7/2008
CA 2780864 C 9/2013
(Continued)

OTHER PUBLICATIONS

Extended European Search Report in corresponding EP Application, dated Oct. 16, 2017.
(Continued)

*Primary Examiner* — Joseph Dallo
(74) *Attorney, Agent, or Firm* — Carie C. Mager (57) ABSTRACT

A method for operating a gaseous-fuelled internal combustion engine by directly injecting the gaseous fuel into the combustion chamber is disclosed wherein the gaseous fuel is injected at injection pressures higher than 300 bar and the pressure ratio between the gaseous fuel injection pressure and the peak cylinder pressure is between 1.6:1 and 3:1, and preferably between 2.5:1 to 2.8:1. The injection pressure is selected to be between 300 and 540 bar and preferably between 300 bar and 440 bar. The injection pressure can be selected based on a preferred range for the pressure ratio.

19 Claims, 9 Drawing Sheets

(51) Int. Cl.
*F02B 43/00* (2006.01)
*F02D 41/40* (2006.01)
*F02D 41/00* (2006.01)
*F02D 41/38* (2006.01)
*F02M 21/02* (2006.01)
*F02D 41/14* (2006.01)

(52) U.S. Cl.
CPC ..... *F02D 41/0027* (2013.01); *F02D 41/0052* (2013.01); *F02D 41/38* (2013.01); *F02M 21/0275* (2013.01); *F02B 43/00* (2013.01); *F02D 41/0007* (2013.01); *F02D 41/1461* (2013.01); *F02D 41/401* (2013.01); *F02D 2041/389* (2013.01); *F02D 2250/31* (2013.01); *F02M 21/0218* (2013.01); *Y02T 10/32* (2013.01); *Y02T 10/47* (2013.01)

(58) Field of Classification Search
CPC .. F02D 35/023; F02D 41/401; F02D 41/0007; F02D 2250/31; F02D 2041/389; F02M 21/0275; F02M 21/0218; Y02T 10/32; F02B 43/00
See application file for complete search history.

(56) References Cited

U.S. PATENT DOCUMENTS

| | | | |
|---|---|---|---|
| 7,090,145 B2 | 8/2006 | Baker et al. | |
| 7,162,995 B2 | 1/2007 | Munshi | |
| 7,188,470 B2* | 3/2007 | Bosteels | B01D 53/9431 123/670 |
| 7,308,889 B2 | 12/2007 | Post et al. | |
| 7,451,942 B2 | 11/2008 | Borissov | |
| 7,463,967 B2 | 12/2008 | Ancimer et al. | |
| 7,527,048 B2 | 5/2009 | Gillston et al. | |
| 8,028,676 B2 | 10/2011 | Ancimer et al. | |
| 8,095,294 B1 | 1/2012 | Griffiths et al. | |
| 8,322,325 B2 | 12/2012 | Rogak et al. | |
| 8,469,009 B2 | 6/2013 | Munshi et al. | |
| 8,555,852 B2 | 10/2013 | Munshi et al. | |
| 2006/0213488 A1 | 9/2006 | Post et al. | |
| 2007/0245982 A1* | 10/2007 | Sturman | F02B 21/00 123/26 |
| 2008/0264393 A1* | 10/2008 | Sturman | F02B 9/04 123/568.14 |
| 2009/0120385 A1* | 5/2009 | Munshi | C10L 3/06 123/3 |
| 2012/0160221 A1* | 6/2012 | Munshi | C10L 3/06 123/575 |
| 2015/0219027 A1* | 8/2015 | zur Loye | F02D 41/0027 60/603 |

FOREIGN PATENT DOCUMENTS

| | | |
|---|---|---|
| DE | 102009035579 A1 | 2/2001 |
| FR | 2897108 A1 | 8/2007 |
| JP | 2005344639 A | 12/2005 |
| WO | 2004101972 A1 | 11/2004 |

OTHER PUBLICATIONS

International Search Report and Written Opionion of the International Searching Authority, dated Jun. 10, 2015.

* cited by examiner

METHOD AND SYSTEM FOR OPERATING GASEOUS-FUELLED DIRECT INJECTION INTERNAL COMBUSTION ENGINE

TECHNICAL FIELD

The present invention relates to a method for operating a gaseous-fuelled internal combustion engine where a gaseous fuel is directly injected into the combustion chamber at pressures higher than 300 bar.

BACKGROUND OF THE INVENTION

Gaseous-fuelled internal combustion engines are becoming known in the automotive industry as a possible alternative to diesel fuelled engines. Replacing diesel fuel with gaseous fuels provides the potential for reducing emissions as diesel fuel burns with higher concentrations of pollutants. Gaseous fuels are generally defined herein as fuels that are in gaseous phase at standard pressure and temperature conditions. "Standard pressure and temperature" are defined herein to be an absolute pressure of 1 bar (14.5 psi) and 0 degrees Celsius (32 degrees Fahrenheit). Natural gas is a mixture of combustible gases and its exact composition varies depending on the source, but it is ordinarily primarily methane. Other gaseous fuels include ethane, propane, and other flammable gaseous hydrocarbon derivatives as well as hydrogen and mixtures thereof. Compared to conventional liquid fuels, the disclosed gaseous fuels are generally cleaner burning, can be produced from renewable sources and are generally readily available. For example, natural gas is one of the most abundant hydrocarbon fuels available today.

A challenge, however has been to substitute diesel fuel with gaseous fuels while maintaining the performance of diesel-fuelled engines including the power and efficiency of a diesel engine and at the same time further reducing the engine emissions.

For one type of internal combustion engines, gaseous fuel is injected directly into the combustion chamber of the internal combustion engine, when the piston is near top dead center causing the fuel to burn in a diffusion combustion mode or in a stratified mode and in such direct injection engines gaseous fuel can be ignited by a small amount of pilot fuel, for example diesel fuel that enables a complete and efficient combustion of the fuel. Such dual fuel engines have been described in previous patents by the applicant, for example in several United States patents (U.S. Pat. No. 7,463,967, U.S. Pat. No. 8,028,676, U.S. Pat. No. 8,469,009 and U.S. Pat. No. 8,555,852).

Because gaseous fuels are compressible fluids, it takes more energy to compress and raise the pressure of gaseous fuels compared to liquid fuels. Therefore in the past one of the main factors in determining the maximum gaseous fuel injection pressure has been to use the minimum pressure required to force gas into the combustion chamber at full load. A lower injection pressure for gaseous fuels has been generally desired because employing higher injection pressures increases the parasitic load on the engine system. Since conventional diesel fuelled engines which have been converted to a dual fuel operation have a maximum cylinder pressure during the compression stroke of around 200 bar, a gaseous fuel injection pressure higher than around 200 bar, for example an injection pressure of up to about 300 bar (30 MPa or 4,350 psi) has been sufficient for overcoming the cylinder pressure with enough energy to disperse the gaseous fuel within the combustion chamber and to inject the desired amount of fuel for achieving an efficient combustion, as described in applicant's U.S. Pat. No. 8,095,294. This patent recognizes that changes in the cylinder pressure can influence the speed at which the valve needle of the fuel injector opens and closes and thereby can influence the amount of fuel being injected into the combustion chamber and addresses this problem by correcting the amount of time that the fuel injector stays open (the "pulse width") to thereby adjust the fuelling amount. Injecting the gaseous fuel at higher pressures is not investigated.

Co-owned U.S. Pat. No. 7,162,995 describes a method of injecting gaseous fuel into a high pressure direct injection internal combustion engine comprising selecting an injection pressure that results in an under-expanded gaseous fuel beyond and proximate to the injector nozzle and mentions injecting gaseous fuel into the combustion chamber at an injection pressure greater than 30 MPa (300 bar) with a pressure ratio which is a function of the injection pressure and the cylinder pressure in excess of a ratio beyond which gas flow is choked. Such a pressure ratio provides the pressures necessary for a supersonic flow into the combustion chamber of a natural gas fuelled direct injection engine while avoiding interference with the cylinder walls and piston. As described in this patent, in most cases the injection pressure would be in excess of 10 MPa (100 bar) and will be selected such that it avoids the gas jet interference with the cylinder walls or piston.

While gaseous fuels are generally cleaner burning than conventional diesel engines, tailpipe emissions from gaseous-fuelled engines can be further improved to reduce the levels of particulate matter, hydrocarbons and NOx by applying an after-treatment to the gases exhausted from the engine. Such an after-treatment system can be complex and increases the cost of the overall engine system.

While some of the existing prior art has mentioned injecting gaseous fuel into the combustion chamber of an internal combustion engine at injection pressures higher than 300 bar, no known prior art has further investigated the engine performance and efficiency at such high pressures to identify a preferred range for the injection pressure and for the pressure ratio between the injection pressure and the peak cylinder pressure that would allow a better engine performance and efficiency while improving engine emissions.

Therefore there is still a need to investigate such engine parameters for further reducing the emission levels in gaseous-fuelled engines and for reducing the complexity and cost of the after-treatment system while maintaining or preferably improving the engine efficiency and performance.

SUMMARY

A method is disclosed for operating a gaseous-fuelled direct injection internal combustion engine. The method comprises injecting the gaseous fuel directly into the combustion chamber at an injection pressure higher than 300 bar wherein the ratio between the injection pressure and the peak cylinder pressure is between 1.6:1 and 3:1. In preferred embodiments the ratio between the injection pressure and the peak cylinder pressure is between 2.5:1 and 2.8:1. It was demonstrated that for some engines the most benefits in engine efficiency and reduced particulate matter emissions are achieved when the injection pressure is higher than 300 bar and less than around 540 bar, and preferably less than 440 bar.

The injection pressure is defined here to mean the pressure of the gaseous fuel in the plenum of the injector. The plenum of the injector is known in the industry to be the fuel cavity located in the bottom region of the injector which surrounds the needle valve above the valve seat. As illustrated in applicant's U.S. Pat. Nos. 7,527,048 and 7,090,145 or in Canadian patent no. 2780864 the fuel cavity is supplied with fuel from a common rail through a fuel inlet. In these designs, the pressure of the gaseous fuel in the plenum of the injector, hence the injection pressure is substantially the same as the gas rail pressure. In other injector designs, fuel is supplied from the common rail to the injector at a lower pressure and the pressure of the fuel is increased to the desired pressure for injection into the combustion chamber by an intensifier located in the injector body. In these designs, the injection pressure which is the pressure in the plenum of the injector is generally higher than the gas rail pressure.

For engines equipped with an exhaust gas recirculation system, the method further comprises detecting the NOx emissions generated by operating the engine and increasing the amount of exhaust gas recirculated to the engine intake whereby the NOx emissions are maintained below a maximum predetermined level.

The gaseous fuel injection pressure can be determined based on the fuel delivery parameter which is defined as a function of a predetermined static flow rate for the gaseous fuel through an injector nozzle and a predetermined engine power per cylinder. In the present disclosure, the fuel delivery parameter is preferably in the range between 0.45 and 0.6.

In the present method the injection pressure and the orientation of the jet of gaseous fuel injected in the combustion chamber is determined such that the jet is impinging on at least one surface of the piston within the combustion chamber. The orientation of the gaseous fuel jet when it is injected into the combustion chamber depends, for example, on the injection angle and on the positioning of the injector nozzle within the combustion chamber.

A gaseous-fuelled direct injection internal combustion engine comprises a combustion chamber, a gaseous fuel injector for injecting an amount of gaseous fuel directly into the combustion chamber, an intake air system for introducing an amount of air into the combustion chamber and an exhaust gas system comprising an exhaust gas line in communication with the combustion chamber. The internal combustion engine also comprises a controller programmed to control the injection pressure of the gaseous fuel to a pressure higher than 300 bar and having a value determined as a function of the pressure ratio between the injection pressure of the gaseous fuel and the peak cylinder pressure, wherein the pressure ratio is between 1.6:1 and 3:1. The engine further comprises an ignition assist device to help ignite the gaseous fuel. In some embodiments, the engine comprises a pilot fuel injector for introducing an amount of pilot fuel directly into the combustion chamber, wherein the pilot fuel assists with ignition of the gaseous fuel, or the pilot fuel can be injected by a dual fuel injector which can inject both the gaseous fuel and the pilot fuel directly into the combustion chamber. In other embodiments other well-known ignition assist devices such as hot surfaces (e.g. glow plugs), spark plugs and catalytic elements can be employed instead of, or in conjunction with a pilot fuel.

In preferred embodiments the pressure ratio between the injection pressure of the gaseous fuel and the peak cylinder pressure is between 2.5:1 and 2.8:1. For some engines the most benefits in engine efficiency and reduced particulate matter emissions are achieved when the injection pressure is higher than 300 bar and less than around 540 bar, and preferably less than 440 bar.

The gaseous fuel injector has a nozzle having holes through which gaseous fuel is injected into the combustion chamber and the diameter of the holes is calculated based on a fuel delivery parameter which is a function of the gaseous fuel injection pressure and a predetermined engine power per cylinder. In preferred embodiments the fuel delivery parameter has a value in the range between 0.45 and 0.6.

BRIEF DESCRIPTION OF THE DRAWINGS

The drawings illustrate specific preferred embodiments of the apparatus and the experimental results of the present method, but should not be considered as restricting the spirit or scope of the invention in any way.

DETAILED DESCRIPTION OF THE PREFERRED EMBODIMENTS

Figure 1:
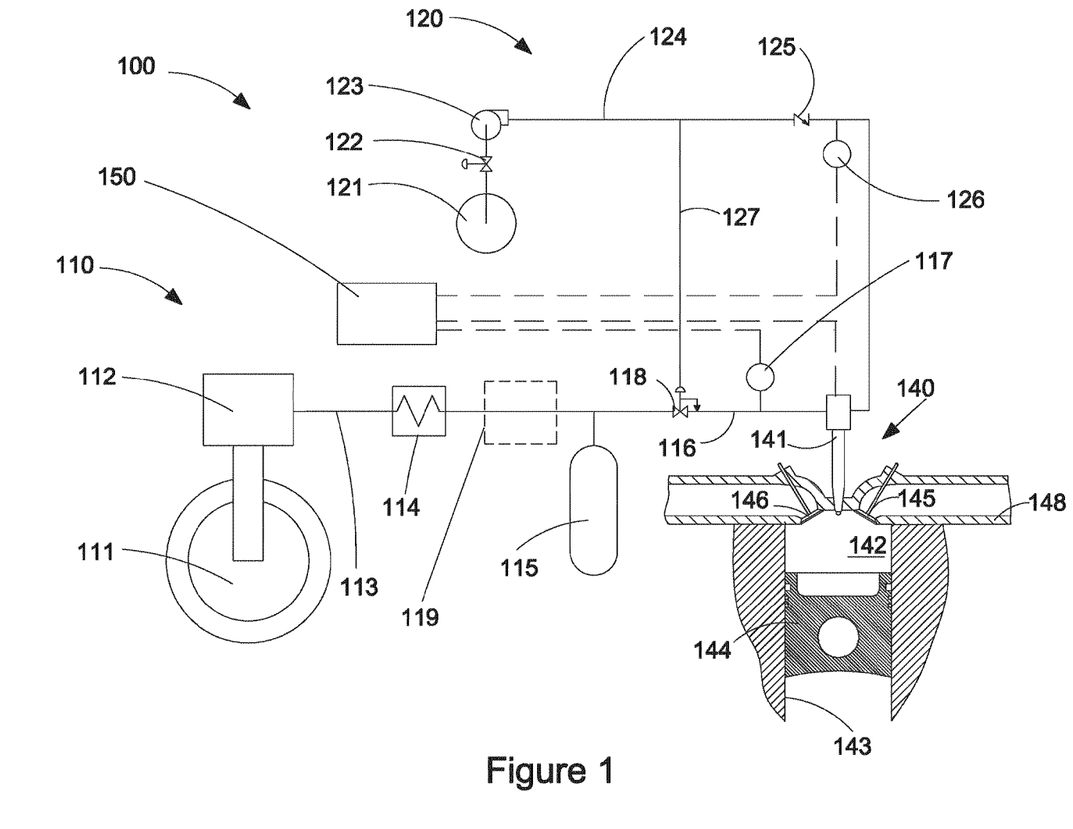
FIG. 1 is a schematic view of a direct injection gaseous-fuelled internal combustion engine system that can be used to practice the disclosed method.

Referring to FIG. 1, internal combustion engine system 100 shows an illustrative embodiment of a direct injection gaseous-fuelled engine. In this example, the system stores the gaseous fuel as a liquefied gas in gas storage tank 111 and injects the gaseous fuel directly into the combustion chamber through fuel injection valve 141. In this embodiment a pilot fuel that is more readily ignited compared to the main gaseous fuel is injected through the fuel injection valve 141 to assist with ignition of the gaseous fuel. In other embodiments (not illustrated) other well-known ignition assist devices such as hot surfaces (e.g. glow plugs), spark plugs and catalytic elements can be employed instead of, or in conjunction with a pilot fuel. The manner in which the gaseous fuel is stored is not important for the disclosed method, and the gaseous fuel can be stored in a pressure vessel as a compressed gas, or for a stationary application the fuel can be delivered from a pipeline and compressed to the needed pressure. In the illustrated figure, the fuel is stored as liquefied natural gas (LNG), pressurized to a desired pressure and then vaporized to be delivered in gaseous form to the fuel injector.

Internal combustion engine system 100 generally comprises gaseous fuel delivery subsystem 110, pilot fuel delivery subsystem 120, fuel injection subsystem 140, and controller 150. Each of these subsystems is described in more detail below.

Gaseous fuel delivery subsystem 110 comprises storage tank 111, pump 112, gaseous fuel supply line 113, vaporizer 114, accumulator vessel 115, gaseous fuel rail 116, gaseous fuel rail pressure sensor 117, and pressure regulating valve 118. For engines used to power vehicles, space on-board the vehicle for carrying fuel can be limited so it is desirable to store gaseous fuels in liquefied form at cryogenic temperatures because this increases the energy density of the fuel, reducing the storage volume. Pump 112 is shown with a suction inlet disposed inside the cryogenic space of storage tank 111, and the working chamber of pump 112 can also be immersed in the cryogenic space, with a drive shaft extending therefrom and connected to a drive unit disposed outside the cryogenic space, or the working chamber of pump 112 can be completely external to storage tank 111, with a thermally insulated pipe connecting the pump to the storage tank. In some embodiments, a booster compressor 119, with an outline shown in FIG. 1 by dashed lines, can be provided on the gaseous fuel line to further increase the pressure at which the gaseous fuel is delivered to the fuel injector. The disclosed method could also work with the gaseous fuel stored in a gaseous form, for example as compressed natural gas (CNG), stored in a pressure-rated vessel.

Pilot fuel delivery subsystem 120 comprises storage tank 121, metering valve 122, pump 123, pilot fuel rail 124, check valve 125, pilot rail pressure sensor 126, and pilot fuel line 127. In the illustrated embodiment, metering valve 122 controls pilot fuel pressure in pilot fuel rail 124 by controlling the quantity of pilot fuel that is delivered to pump 123. Pilot fuel line 127 dead-ends at the control chamber of pressure regulating valve 118 thereby operating a valve member in pressure regulating valve 118 to control the fuel pressure in gaseous fuel rail 116 as a function of the pilot fuel pressure in pilot fuel rail 124. Through this arrangement gaseous fuel pressure is controlled through pilot fuel pressure. The present method can also be employed in systems comprising other arrangements for separately controlling the pilot fuel rail pressure and the gaseous fuel rail pressure or arrangements that control pilot fuel pressure as a function of gaseous fuel pressure.

In preferred embodiments, the engine system illustrated in FIG. 1 is employed by a multi-cylinder engine with gaseous fuel supply rail 116 delivering fuel to a plurality of fuel injection valves, but to simplify the illustration of the apparatus, only one fuel injection valve and one combustion chamber is shown.

Fuel injection valve 141 injects the fuel directly into combustion chamber 142, which is defined by cylinder 143, piston 144 and cylinder head 148. Intake valve 145 opens during the intake stroke to allow an intake charge to be induced into combustion chamber 142. Intake valve 145 is otherwise closed. The intake charge can comprise only air or air and recirculated exhaust gas if the engine is equipped with an exhaust gas recirculation system as further shown in FIG. 2. During the intake stroke exhaust valve 146 stays closed.

As shown in FIG. 1 by dashed data communication lines, controller 150 communicates with a number of components to receive measured engine parameters from sensors, such as for example, gaseous fuel rail pressure and pilot fuel rail pressure, and to send signals to actuators of engine components, such as for example fuel injection valve 141, pump 112 and pump 123. Controller 150 can be the engine controller itself or it can be a separate controller that interacts with a conventional diesel engine controller used by the engine before being modified to operate with gaseous fuel as the primary fuel. While instrumentation exists to measure cylinder pressure directly, such instrumentation is expensive, more suited to research purposes and is not considered economical, practical and reliable enough for large-volume commercial use. Therefore, cylinder pressure during an injection event is typically approximated by reconstruction from indirect measurements of parameters that correlate to cylinder pressure such as the intake manifold pressure and temperature, exhaust manifold pressure, engine speed and the timing for start of injection. In the present disclosure, test results are illustrated as a function of the injection pressure which is defined herein as the pressure of the fuel in the plenum cavity of the injector and as a function of the ratio between injection pressure and cylinder pressure.

When controller 150 interacts with a conventional diesel engine controller, controller 150 can receive input data from the diesel engine controller such as, by way of example, the timing for start of injection, the fuelling amount, and other input data indicating values associated with a parameter indicative of an engine operation state, such as for example engine speed.

Figure 2:
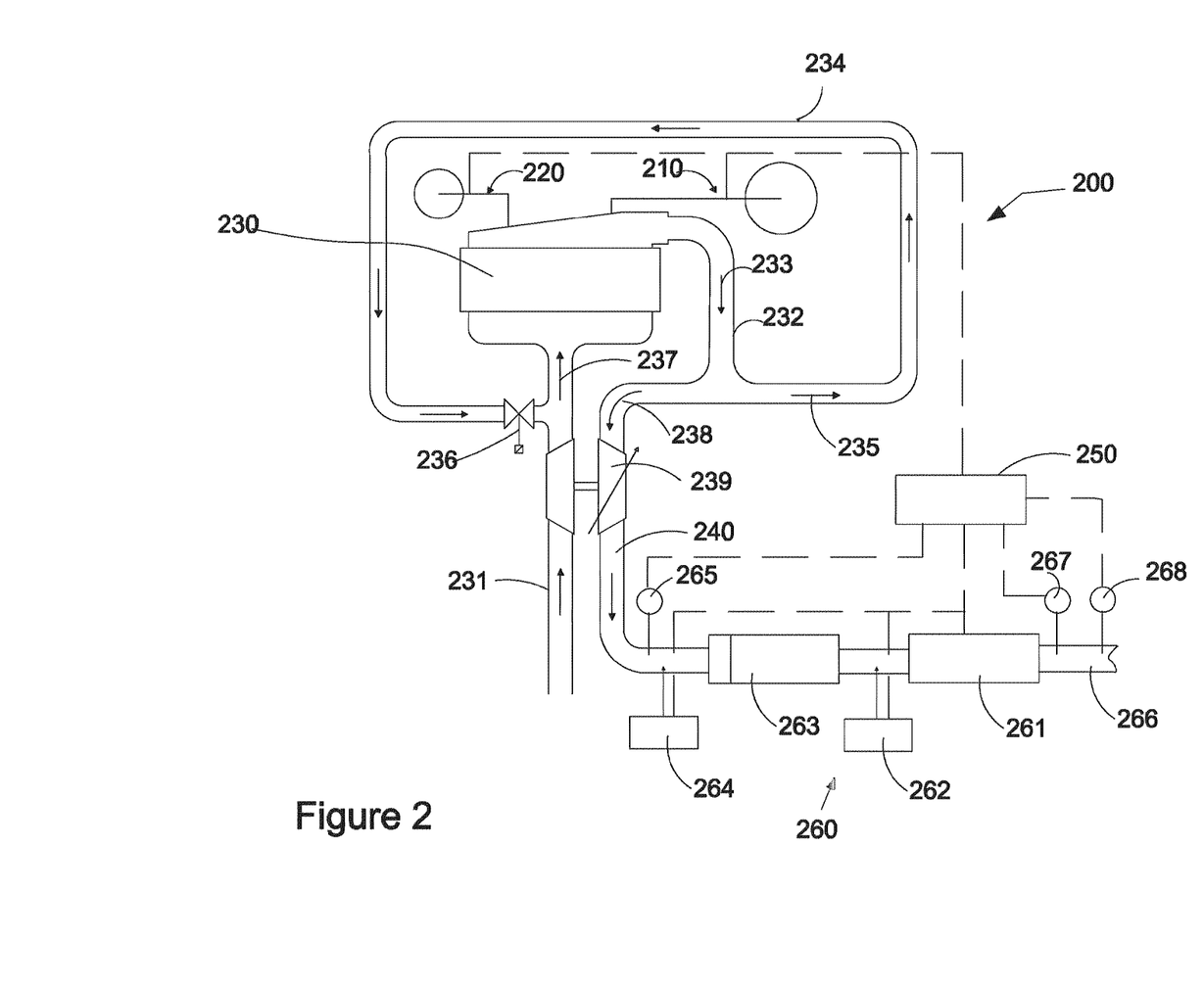
FIG. 2 is a schematic view of a direct injection gaseous-fuelled internal combustion engine system comprising an exhaust after-treatment subsystem and an exhaust gas recirculation loop.

The engine system illustrated in FIG. 1 can further comprise additional equipment such as an exhaust gas after-treatment system for further controlling the vehicle emissions. Such an after-treatment system is illustrated in FIG. 2 which shows a schematic view of a direct-injection gaseous-fuelled internal combustion engine system comprising an exhaust after-treatment subsystem and an exhaust gas recirculation loop. Internal combustion engine system 200 generally comprises engine 230, gaseous fuel delivery subsystem 210, diesel fuel delivery subsystem 220, and controller 250. The engine system further comprises air intake line 231 and exhaust gas line 232. Some of the exhaust gas exiting the engine in direction 233 is directed through exhaust gas recirculation loop 234 in direction 235 and through valve 236 into air intake line 231 where it is mixed with intake air flowing through air intake line 231. The mix of fresh intake air and recirculated exhaust gas is delivered to the intake ports of engine 230 in the direction shown by arrow 237. The exhaust gas exiting engine 230, which is not recirculated, flows in direction shown by arrow 238 through the turbine of turbocharger 239 and on to line 240 which is connected to exhaust gas after-treatment subsystem 260 and from there the exhaust gas is released into the atmosphere through the exhaust pipe 266. Turbocharger 239 preferably has a variable geometry as known in to those skilled in this technology.

In the illustrated embodiment, exhaust gas after-treatment subsystem 260 comprises selective catalytic reduction (SCR) converter 261, urea injection system 262, particulate filter 263 (known as a "DPF") and diesel fuel injector 264. DPF 263 may comprise a diesel oxidation catalyst device for oxidizing the hydrocarbons and carbon monoxide within the exhaust gas.

Such exhaust after-treatment systems as the one illustrated in FIG. 2 can be expensive and add to the overall cost of the engine systems. Therefore it would be desirable to reduce the engine emissions, in particular the particulate matter emissions, to preferably eliminate the after-treatment system or to replace it with lower cost alternatives. NOx sensors 265 and 267 and particulate matter sensor 268 can be placed in the engine exhaust for detecting the engine's NOx and respectively particulate matter emissions.

Figure 3A:
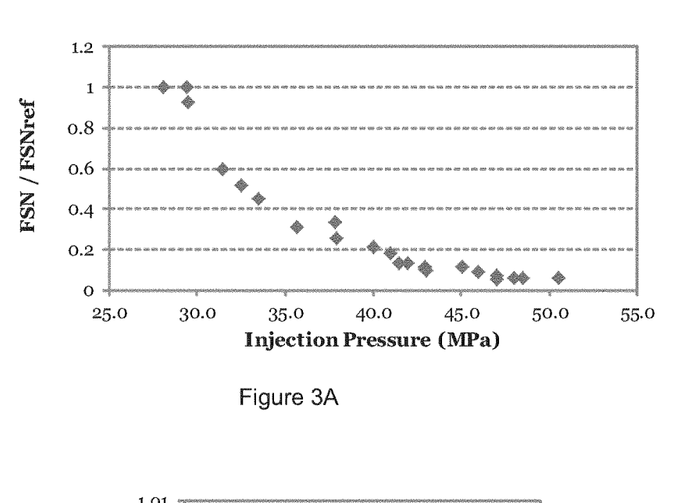
FIGS. 3A, 3B and 3C show the graphs illustrating the values of the filter smoke number, the peak cylinder pressure and respectively the turbine inlet temperature which were recorded when operating a gaseous-fuelled internal combustion system of the present disclosure at different injection pressures and such values are represented relative to the respective reference values for these parameters recorded for a 15 liter test engine at an injection pressure of 28.5 MPa.

It has been found that for engine systems such as the ones illustrated in FIGS. 1 and 2 a considerable reduction in the FSN (filter smoke number) of up to 90% can be achieved by increasing the injection pressure above 30 MPa (300 bar). The filter smoke number (FSN) is considered to be an indicator that is directly correlated with the engine particulate matter emissions. These results are illustrated in FIG. 3A which shows a decreasing trend for the ratio between the filter smoke number (FSN) and the reference filter smoke number ($FSN_{ref}$). As shown in FIG. 3A the filter smoke number is reduced compared to the reference filter smoke number for injection pressures over 30 MPa (300 bar), especially for injection pressures between 30 MPa and around 45 MPa. The illustrated results have been obtained for a conventional 15 liter direct injection gaseous-fuelled engine operated at a speed of 1500 RPM and a torque of 2400 N·m. In FIG. 3A FSN represents the filter smoke numbers measured when the engine was operating at different injection pressures and $FSN_{ref}$ represents the filter smoke number for a base fuelling condition of the tested engine at an injection pressure of around 28.5 MPa (285 bar).

The tests conducted on the sample engine at injection pressures higher than 300 bar, illustrated in FIG. 3A, show different results than the results described in the prior art, for example in U.S. Pat. No. 8,091,536, which were obtained by operating an internal combustion engine fuelled with a mixture of hydrogen and methane at different pressure ratios of up to 3:1, with different combustion timings and at pressures of up to 300 bar. The tests in the cited prior art, which were conducted at an engine speed of 800 RPM and low load, concluded that higher injection pressures resulted in slightly increased levels of particulate matter compared to engines fuelled with the same gaseous fuel mixture but with lower injection pressures.

Figure 3B:
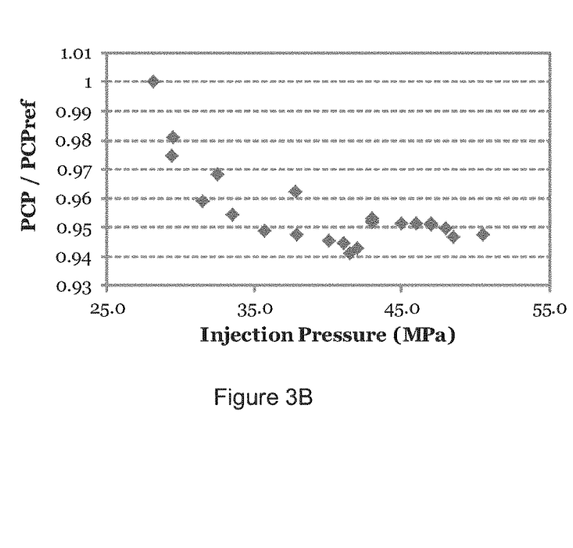
Figure 3C:
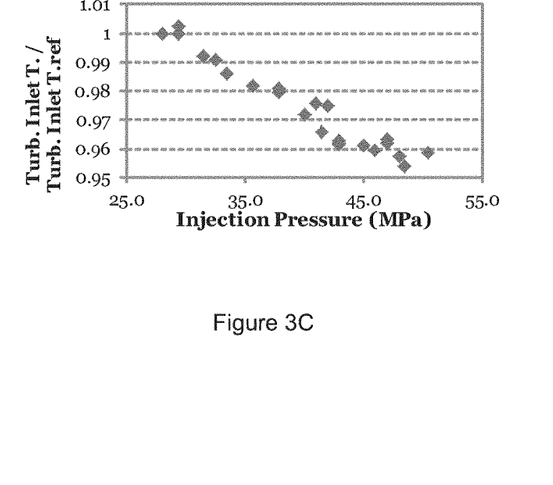

As further illustrated in FIGS. 3B and 3C it was also observed that peak cylinder pressure (PCP) and turbine inlet temperature (Turb. Inlet T.) decrease at increased injection pressures compared to the respective values of these parameters for a reference injection pressure of 28.5 MPa (285 bar). This was demonstrated for the same 15 liter test engine and under the same engine operating conditions (engine speed of 1500 RPM and torque of 2400 N·m). The ratio between the peak cylinder pressure (PCP) at different injection pressures and a reference value for the peak cylinder pressure for an injection pressure of 28.5 MPa ($PCP_{ref}$), illustrated in FIG. 3B, showed a decreasing trend, with a more noticeable difference for injection pressures between 300 and 440 bar. A similar decreasing trend was observed for the ratio between the measured turbine inlet temperatures (Turbo. Inlet T.) and a reference value (Turbo.Inlet T. ref) for the turbine inlet temperature measured for an injection pressure of 28 MPa as illustrated in FIG. 3C. Since peak cylinder pressure is a parameter that limits the advancing of combustion within the combustion chamber and turbine inlet temperature is a parameter that limits how late in an engine cycle the combustion can be delayed, the results illustrated in FIGS. 3B and 3C show positive effects that allow a more flexible combustion phasing strategy for a direct injection gaseous-fuelled engine operated at injection pressures higher than 300 bar. The tests illustrated here have taken into consideration the turbine inlet temperature because the tested engine system also included a turbocharger comprising a turbine installed in the exhaust system to use the enthalpy in the exhaust to drive a compressor which increases the intake air pressure, but in other systems that do not use a turbocharger the data shown in FIG. 3C corresponds to the temperature of the exhaust gas leaving the engine's exhaust manifold.

The results of the tests conducted as described above also show that there are diminishing benefits in terms of reduced FSN, reduced peak cylinder pressure and reduced turbine inlet temperature by increasing the injection pressure above 45 MPa (450 bar), and more specifically above 44 MPa (440 bar). Because there are parasitic losses associated with increasing injection pressure, the experimental data shows that there is an upper limit to the desirable range of gaseous fuel injection pressure.

In the tested engines, for all the test results illustrated in the present disclosure, the injector did not comprise an intensifier and therefore the injection pressure was substantially the same as the gas rail pressure. It would be understood that the same test results and preferred values for the injection pressures and the pressure ratios discussed herein would apply to engines using an injector which comprises an intensifier.

Figure 4:
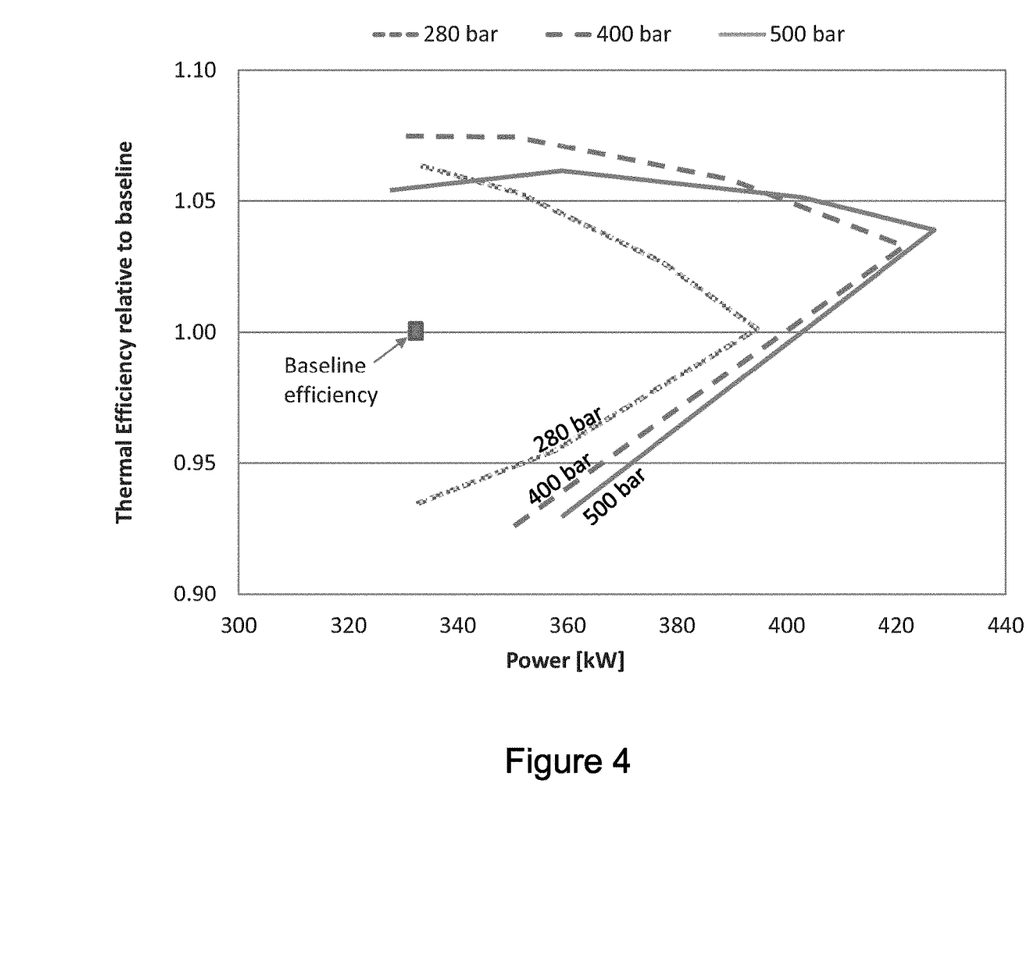
FIG. 4 shows a graph illustrating the values for the engine power and thermal efficiencies values recorded when operating a gaseous-fuelled direct injection engine at different injection pressures where the thermal efficiency values are represented relative to a baseline engine operating condition.

The positive effects of increasing the gaseous fuel injection pressures on the peak cylinder pressure and on the turbine inlet temperature or the exhaust gas temperature allow a more flexible combustion phasing strategy, which allows the advance and/or delay of the combustion timing while increasing the fuel injection quantity which means that the engine can generate more power. The higher injection pressure increases both the fuel injection rate and the combustion rate which allows a higher efficiency for a given power including an increase in efficiency at maximum power. The effect of the injection pressure increase on the engine's thermal efficiency and engine power is shown in FIG. 4 which illustrates the thermal efficiency relative to the baseline thermal efficiency as a function of engine power for three different injection pressures at an engine speed of 1750 RPM, with a fixed EGR rate of around 12% for a 15 liter engine with a maximum power rating of 356 kW. The baseline thermal efficiency is the thermal efficiency for a conventional 15 liter direct injection gaseous-fuelled engine operated at a speed of 1500 RPM and a torque of 2400 N·m, This data also shows that increasing the gaseous fuel injection pressure to about 500 bar does not show a significant benefit over operating the engine with an injection pressure of about 400 bar again showing that there is a desirable range of gaseous fuel injection pressure which has upper and lower limits.

Figure 5A:
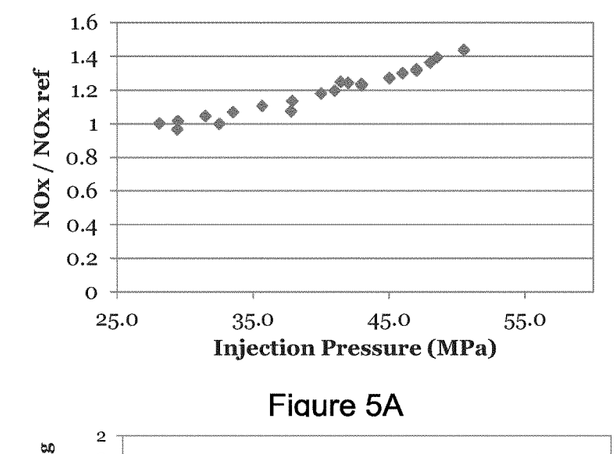
FIGS. 5A to 5D show the graphs illustrating the measured values for NOx, peak heat release rate, ringing intensity and peak rate of cylinder pressure rise which were recorded when operating the present gaseous-fuelled internal combustion engine at different injection pressures and these values are represented relative to their reference values recorded for an injection pressure of 28 MPa.
Figure 5B:
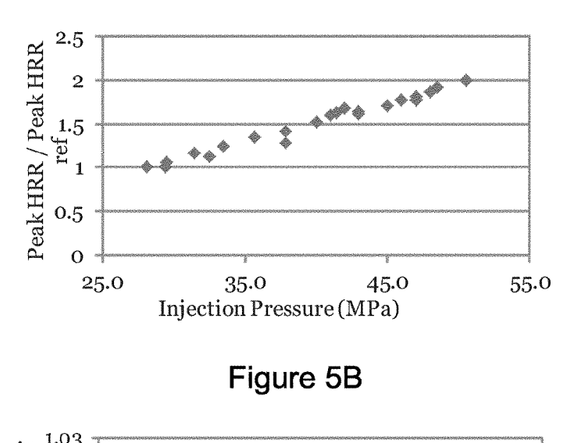
Figure 5C:
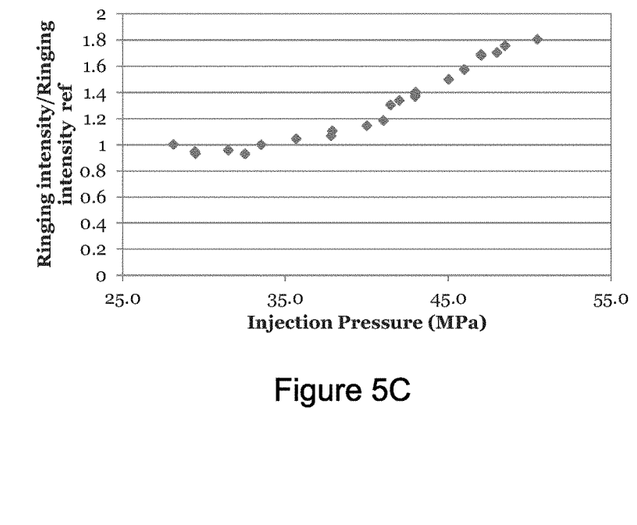

During the tests conducted on a 15 liter gaseous-fuelled direct injection internal combustion engine operated at an engine speed of 1500 RPM and a torque of 2400 N·m, with a fixed air supply, EGR and fuel flow rate it has been observed that the NOx emissions, the peak heat release rate and the ringing intensity also tend to increase beyond the applicant's acceptable levels at injection pressures over around 440 bar, as illustrated in FIGS. 5A, 5B and 5C. FIG. 5A illustrates the measured NOx emissions relative to a reference NOx emission value, FIG. 5B illustrates the peak heat release rate (HRR) relative to a peak heat release rate reference value and FIG. 5C illustrates the estimated ringing intensity relative to an estimated reference value for the ringing intensity. The ringing intensity is a parameter indicative of the combustion noise level and is a function of the pressure oscillations in the combustion chamber. All tests were conducted for a 15 liter gaseous-fuelled direct injection engine at an engine speed of 1500 RPM and a torque of 2400 N·m with a fixed air supply rate, EGR rate and fuel flow rate. The reference values for the NOx emissions, the peak heat release rate and the estimated ringing intensity were recorded for the engine operating at around 28 MPa (280 bar) injection pressure.

Figure 5D:
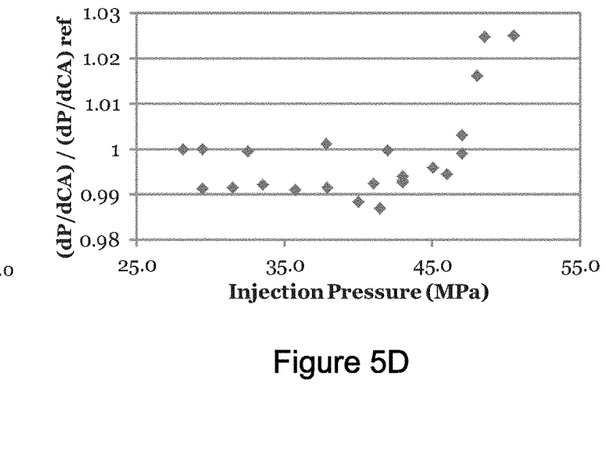

Even though an increase in heat release rate and ringing intensity could be expected when increasing the injection pressure over 300 bar, it was also found that the peak rate of cylinder pressure rise (dP/dCA) which is a common measure of potential for increased engine wear did not increase for gas rail pressures higher than 280 bar until the gas rail pressure reached around 48 MPa (480 bar). FIG. 5D illustrates a graph showing the values of the ratio between the peak rate of cylinder pressure rise (dP/dCA) and the reference value for the peak rate of cylinder pressure rise $(dP/dCA)_{ref}$. These results align with the aforementioned results to teach that, for the subject engine, a preferred range for the gaseous fuel injection pressure is between 300 bar to around 440 bar.

Figure 6:
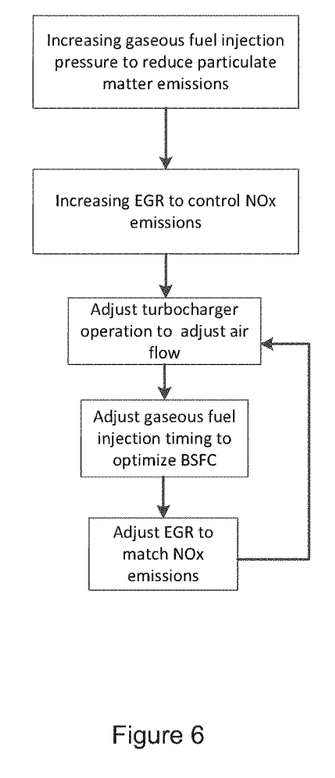
FIG. 6 shows the steps of a method of increasing the gaseous fuel injection pressure and adjusting the exhaust gas recirculation level to control the NOx emissions while optimizing the brake specific fuel consumption value.

Since the results show an increase in NOx emissions when operating the engine at injection pressures higher than 300 bar the method of operating the engine comprises steps to lower such emissions. For engines employing exhaust gas recirculation loops such as the one illustrated in FIG. 2 one method of maintaining NOx emissions within acceptable levels is to increase the exhaust gas recirculation level and to adjust the operation of turbocharger 239 to maintain an appropriate air flow. As illustrated in FIG. 6, in a first step of the method gaseous fuel injection pressure is increased to a predetermined level to reduce the particulate matter emissions and in the next step the exhaust gas recirculation level is increased to control the NOx emissions. The turbocharger operation is then adjusted to maintain an appropriate air flow. In a further step, the gaseous fuel injection timing is adjusted to optimize the brake specific fuel consumption (BSFC) and the exhaust gas recirculation (EGR) amount is adjusted to maintain the NOx emissions within predetermined limits. The NOx emissions can be detected by the NOx sensors 265 and 267 illustrated in FIG. 2, for example. The steps of adjusting the air flow to the engine, adjusting the gaseous fuel injection timing and adjusting the exhaust gas recirculation amount are repeated to maintain a predetermined level of NOx emissions while optimizing the brake specific fuel consumption and engine thermal efficiency.

Figure 7:
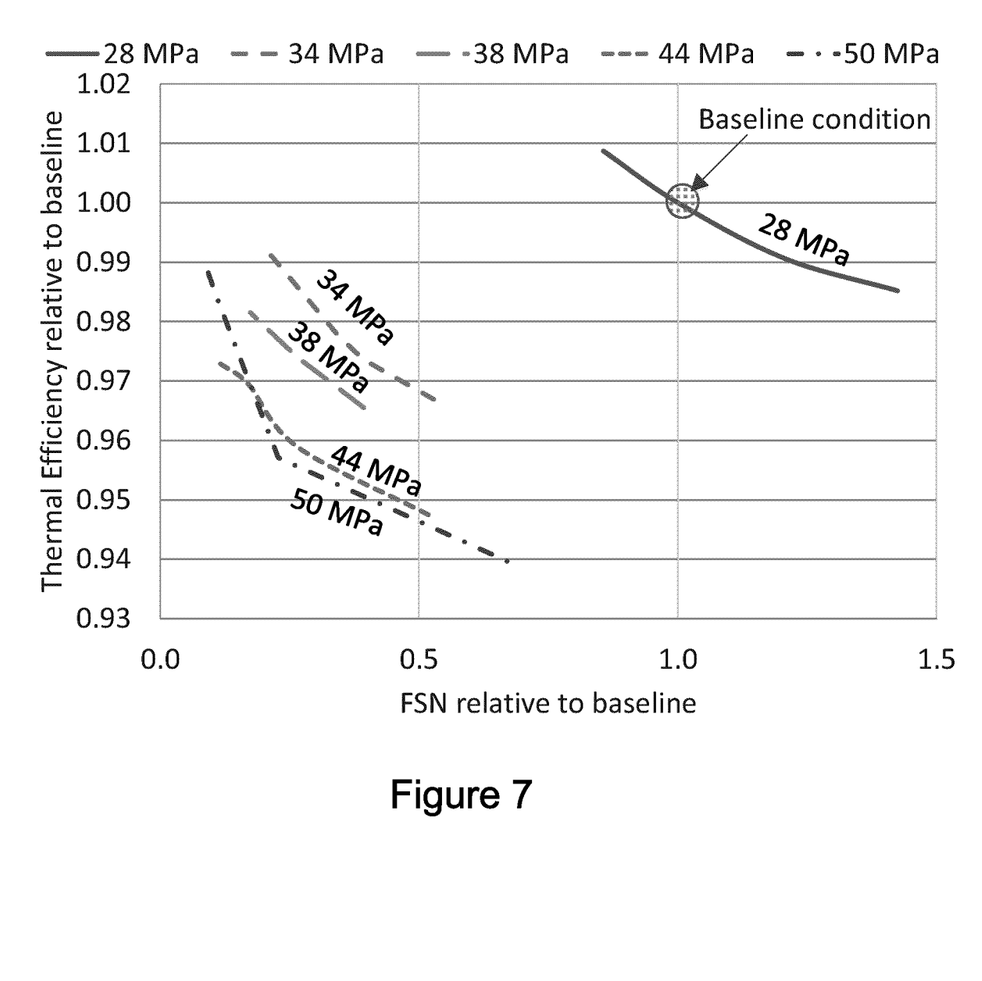
FIG. 7 shows a graph illustrating the estimated thermal efficiency for a gaseous-fuelled internal combustion engine of the present disclosure as a function of the filter smoke number (FSN) for different injection pressures, where these parameters are represented relative to a baseline engine operating condition.

This method was applied to an engine operating at a speed of 1500 RPM and at a torque of 2400 N·m and the injection timing was varied from the most advanced timing corresponding to the peak cylinder pressure (PCP) limit to the most retarded timing while maintaining the exhaust gas temperature below 690 degrees C. Experimental data showed that it was possible to increase exhaust gas recirculation to a level that maintained the NOx emissions at 1.2 g/kWh. The results regarding the engine efficiency and particulate matter emissions when operating with an increased EGR rate are shown in FIG. 7 which illustrates the relationship between thermal efficiency and filter smoke number (FSN) for different injection pressures, wherein both the thermal efficiency and the filter smoke number are represented relative to the respective values of the thermal efficiency and FSN for a baseline engine condition, more specifically for the values of the thermal efficiency and FSN recorded for a conventional 15 liter direct injection gaseous-fuelled engine operated at a speed of 1500 RPM and a torque of 2400 N·m. The results demonstrate that increasing the gaseous fuel injection pressure over 34 MPa (340 bar) improves the particulate matter emissions (FSN) and engine efficiency and also show that the benefits of operating at injection pressures higher than 44 MPa (440 bar) are limited for this engine operating condition. Similar results have been observed for other engine operating modes.

For engines that do not use exhaust gas recirculation, other methods can be used to control the increase in NOx emissions due to operating at higher injection pressures, for example through different combustion phasing strategies such as techniques for delaying combustion, closer to the end of the compression stroke or by changing the operation of the exhaust gas treatment devices.

It is known that the density of gaseous fuel, for example of natural gas, increases with pressure, and therefore in order to deliver the same amount of fuel in the same amount of time, a higher pressure engine system would require a lower volumetric flow rate through the injection valves. This allows the gaseous fuel nozzle to have holes with a reduced diameter compared to a more conventional nozzle that injects fuel at lower injection pressures (up to 300 bar). Having holes with a reduced diameter compared to the conventional nozzle is an advantage because it allows a higher surface to volume ratio for the jet of gaseous fuel being injected into the combustion chamber which promotes a better gaseous fuel/air mixture.

To provide guidance in selecting the appropriate nozzle diameter for an engine a non-dimensional parameter, the fuel delivery parameter (FDP), illustrated in the formula (1) below, was created:

Fuel delivery parameter=Gaseous Fuel Injection Pressure*Static Gas Flow/Engine Power Per Cylinder, (1)

where the static gas flow is the static flow rate through the injector nozzle, which is a manufacturing parameter defined on the basis of air flow through the nozzle at an air supply pressure of 15 psi, 60 degrees Celsius and with zero back-pressure and the engine power per cylinder is the rated engine power divided by the number of firing cylinders.

Figure 8:
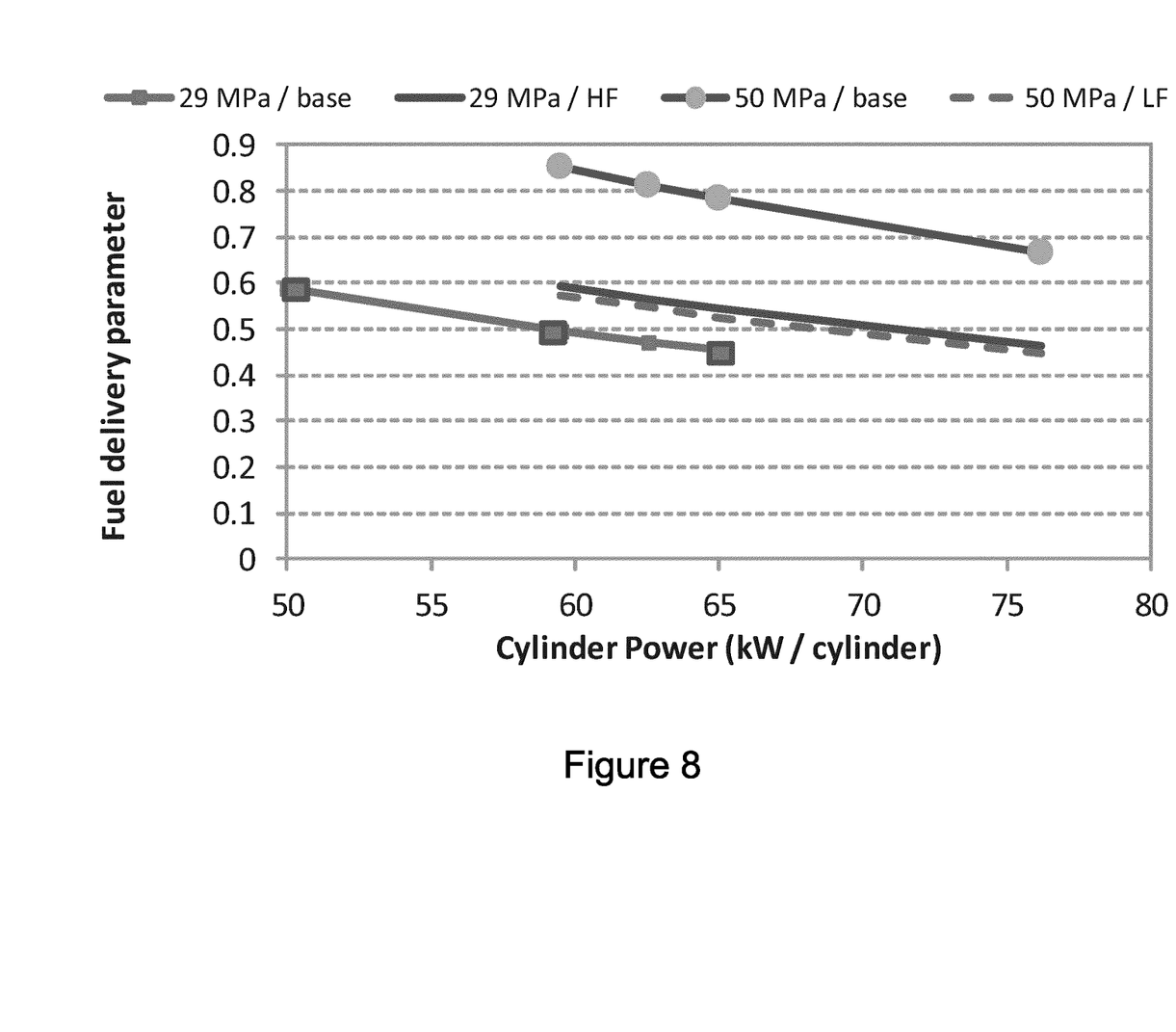
FIG. 8 shows a graph illustrating the values of the fuel delivery parameter for different cylinder power values, for different injection pressures and for different injector nozzle designs of a gaseous-fuelled internal combustion engine disclosed here.

Tests were conducted on commercially available gaseous-fuelled direct injection engines, with respective power ratings of 300-356 kW and 457 kW provided with regular injection nozzles ("base") and, alternatively, with low flow injection nozzles (LF), or high flow nozzles (HF), more specifically with nozzles having a diameter reduced by around 30% compared to the conventional injector nozzle holes for the low flow nozzles and respectively having a diameter increased by around 15% compared to the conventional injector nozzle holes for the high flow nozzles. The results are shown in FIG. 8 which represents the fuel delivery parameter as a function of the cylinder power. It was found that for an engine having regular sized injection nozzles holes the FDP was in the range of 0.45 to 0.6 when the engine was operating at an injection pressure of 29 MPa (290 bar) and that the FDP stayed within the same range of values for the engine employing the low flow nozzles when operating at injection pressures of up to 50 MPa (500 bar), whereby the same amount of fuel is injected into the combustion chamber at higher pressures, which avoids a harsh combustion rate and noisier engine operation.

Based on the above findings a method for determining the injector nozzle hole geometry was determined. The first step of the method is determining the power requirement and the peak cylinder pressure for each engine cylinder. The desired gaseous fuel injection pressure is then calculated as function of the peak cylinder pressure, such that the ratio between the injection pressure and the peak cylinder pressure is maintained for example between 2.5:1 and 2.8:1, as further explained below. The injector static gas flow can then be determined based on a desired fuel delivery parameter in the range of between 0.45 and 0.6 and the nozzle hole diameter can be calculated based on the determined injector static gas flow.

As discussed above, it was found that an injection pressure higher than 300 bar results in lower particulate matter emissions and more engine power and efficiency and that injection pressures in the range of 300 to 440 bar have yielded the most benefits. It was found that such results regarding the injection pressure are influenced by the peak cylinder pressure rating which varies depending on the engine model. It was also found that for all engine types and models, at gaseous fuel injection pressures higher than 300 bar, the pressure ratio between the gaseous fuel injection pressure and the peak in-cylinder pressure is the factor that influences the rate at which fuel is introduced into the combustion chamber and the fuel mixing within the combustion chamber.

Figure 9A:
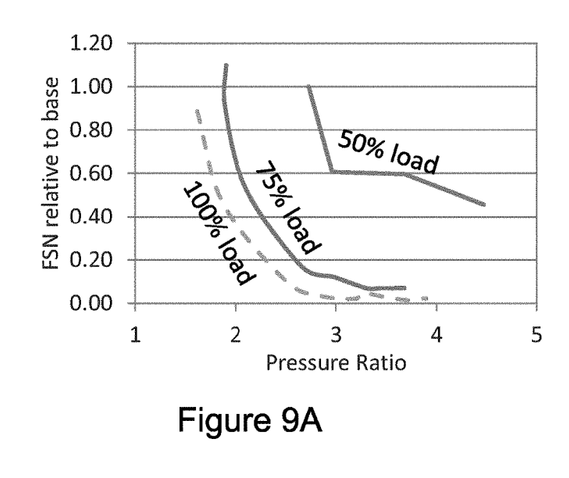
FIGS. 9A to 9D show graphs illustrating the recorded values of the filter smoke number, engine thermal efficiency, ringing intensity and peak heat release rate relative to the respective values for a baseline engine operating condition when operating a gaseous-fuelled engine of the present disclosure at different pressure ratios and in different engine operating modes.
Figure 9B:
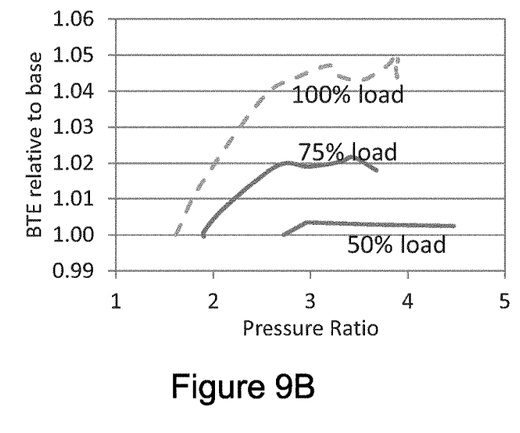
Figure 9C:
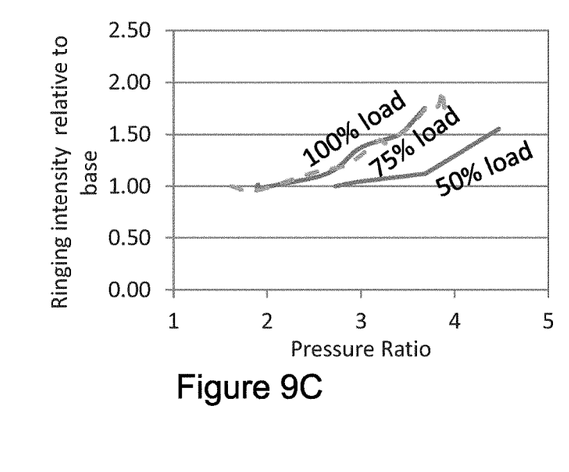
Figure 9D:
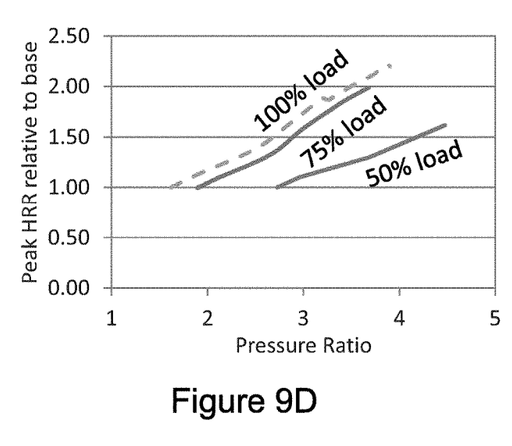

The tests conducted on a gaseous-fuelled direct injection internal combustion engine show that most of the benefits regarding engine efficiency and reduced emissions can be achieved by operating the engine with an injection pressure that corresponds to a pressure ratio between 1.6:1 to 3.0:1. The results of the tests conducted on an engine operating at a speed of 1490 RPM, using nozzles with a hole diameter reduced by around 30% compared to conventional nozzle holes, at different loads (50% load, 75% load and 100% load) are shown in FIGS. 9A to 9D which illustrate the filter smoke number (FSN), the brake thermal efficiency (BTE), the ringing intensity and respectively the peak heat release rate (HRR) as a function of the pressure ratio PR (the ratio between the injection pressure and the peak cylinder pressure). The values of the FSN, the BTE, the ringing intensity and the HRR are represented relative to the respective values of these parameters recorded for baseline engine operating condition (285 bar injection pressure, engine speed of 1500 RPM and engine load of 2400 N·m). Similar tests were conducted on an engine having regular sized injector nozzle holes and similar results were found. These results show that there are no further benefits in either emission reduction or in engine efficiency for PR values over 3:1 and that the majority of the benefits in FSN reduction, and brake thermal efficiency are achieved at pressure ratios between 1.6:1 and 3:1 and preferably between 2.5:1 and 2.8:1. As illustrated in FIGS. 9C and 9D, lower PR values, such as PR values between 2.5:1 and 2.8:1, lead to lower increases in ringing intensity and peak heat release rate, which are beneficial for engine noise and durability. For PR values higher than 3.5:1 some modes of operation showed a penalty in engine efficiency. For some gaseous fuelled internal combustion engines, a PR value of 3:1 generally corresponds to an injection pressure of around 540 bar and therefore for these engines most of the benefits described here will be achieved by operating the engine at injection pressures lower than around 540 bar. For other engine types, injection pressures higher than 540 bar can be employed to achieve the preferred range of pressure ratios presented above.

Based on the above teachings a method for selecting a gaseous fuel injection pressure, at any engine condition for a given engine type and model has been developed. The pressure ratio between the gaseous fuel injection pressure and the peak cylinder pressure at that condition is selected to be within the preferred range, for example between 2.5:1 to 2.8:1, and the desired gaseous fuel injection pressure is calculated based on the identified peak cylinder pressure. The calculated gaseous fuel injection pressure is compared to the range of values for the gaseous fuel injection pressure calculated based on a fuel delivery parameter between 0.45 and 0.6, according to formula (1) and the value for the gaseous fuel injection pressure is adjusted such that it is in the range of values between the injection pressure for the lowest fuel delivery parameter and the injection pressure for the highest fuel delivery parameter.

During all the tests conducted on gaseous-fuelled direct injection internal combustion engines operating at injection pressures higher than 300 bar it was found that a better mixing and greater efficiency can be obtained if the gaseous fuel jet impinges on the cylinder piston. This is different than the prior art described for example in the U.S. Pat. No. 7,162,995 where the engine operates with pressure ratios greater than 2:1 but where the gas injection pressure avoids the gas jet interference with the cylinder piston. The gaseous fuel jet penetration and impingement on the cylinder piston in the present method are a function of the momentum of the gas jet and the density of the cylinder charge. Higher injection pressures, even when using nozzle injection holes with smaller diameter, increase the gas jet penetration which also depends on the orientation of the jet of the gaseous fuel, the design of the piston and of the combustion chamber (e.g. bowl features, bowl diameter) and the injection timing. The orientation of the gaseous fuel jet when it is injected into the combustion chamber depends, for example, on the injection angle and on the positioning of the injector nozzle within the combustion chamber. All these factors are taken in consideration in the current injection strategy in order to achieve a jet penetration that will allow an interference of the jet with a surface of the cylinder piston. This is more important at higher pressures where a good mixing between the charge in the combustion chamber and the injected gaseous fuel is more restricted which can result in poor air utilization and possibly delayed or incomplete burning of the fuel.

While particular elements, embodiments and applications of the subject method and apparatus have been shown and described, it will be understood, that the invention is not limited thereto since modifications can be made by those skilled in the art without departing from the scope of the present disclosure, particularly in light of the foregoing teachings.

We claim:

1. A method of operating a gaseous-fuelled direct injection internal combustion engine, the method comprising injecting said gaseous fuel directly into a combustion chamber at an injection pressure higher than 300 bar wherein an orientation of a jet of said gaseous fuel is determined such that said jet is impinging on at least one surface of a cylinder piston and a ratio between said injection pressure and a peak cylinder pressure is between 1.6:1 and 3:1.

2. The method of claim 1 wherein said injection pressure is higher than 340 bar.

3. The method of claim 1 wherein said injection pressure is less than 540 bar.

4. The method of claim 1 wherein said injection pressure is less than 440 bar.

5. The method of claim 1 wherein said injection pressure is determined based on a fuel delivery parameter which is a function of a predetermined static flow rate for said gaseous fuel through an injector nozzle and a predetermined engine power per cylinder.

6. The method of claim 5 wherein said fuel delivery parameter is a non-dimensional parameter determined by multiplying injection pressure of said gaseous fuel by said predetermined static flow rate divided by a predetermined engine power per cylinder and has a value in the range between 0.45 and 0.6.

7. The method of claim 3 wherein said injection pressure is determined based on a fuel delivery parameter which is a function of a predetermined static flow rate for said gaseous fuel through an injector nozzle and a predetermined engine power per cylinder.

8. The method of claim 7 wherein said fuel delivery parameter is a non-dimensional parameter determined by multiplying injection pressure of said gaseous fuel by said predetermined static flow rate divided by a predetermined engine power per cylinder and has a value in the range between 0.45 and 0.6.

9. A gaseous-fuelled direct injection internal combustion engine comprising:
   a. a combustion chamber,
   b. a gaseous fuel injector having a nozzle with holes for injecting an amount of gaseous fuel directly into said combustion chamber at an injection pressure;
      said holes having a diameter sized as a function of said injection pressure of said gaseous fuel and a predetermined engine power per cylinder,
   c. an intake air system for introducing an amount of air into said combustion chamber,
   d. an exhaust gas system comprising an exhaust gas line in communication with said combustion chamber, and
   e. a controller programmed to control said injection pressure of said gaseous fuel to a pressure higher than 300 bar and having a value determined as a function of a ratio between said injection pressure and a peak cylinder pressure, wherein said ratio is between 1.6:1 and 3:1.

10. The engine of claim 9 having said controller programmed to control said injection pressure of said gaseous fuel to a pressure higher than 340.

11. The engine of claim 9 wherein said injection pressure of said gaseous fuel is less than 540 bar.

12. The engine of claim 9 wherein said injection pressure of said gaseous fuel is less than 440 bar.

13. The method of claim 9 wherein the diameter of said holes is calculated based on a fuel delivery parameter which is a non-dimensional parameter determined by multiplying injection pressure of said gaseous fuel by said predetermined static flow rate divided by a predetermined engine power per cylinder and said fuel delivery parameter has a value in the range between 0.45 and 0.6.

14. The method of claim 1 wherein the injection pressure is determined as a function of injector nozzle hole geometry and a predetermined engine power per cylinder.

15. The method of claim 2 wherein said injection pressure is less than 540 bar.

16. The engine of claim 10 wherein said injection pressure of said gaseous fuel is less than 540 bar.

17. A method of operating a gaseous-fuelled direct injection internal combustion engine, the method comprising injecting said gaseous fuel directly into a combustion chamber at an injection pressure between 340 and 540 bar wherein a ratio between said injection pressure and a peak cylinder pressure is between 1.6:1 and 3:1.

18. The method of claim 17 wherein the injection pressure is determined as a function of an injector nozzle hole geometry and a predetermined engine power per cylinder.

19. The method of claim 17 wherein said injection pressure is determined based on a fuel delivery parameter which is a function of a predetermined static flow rate for said gaseous fuel through an injector nozzle and a predetermined engine power per cylinder.

* * * * *

UNITED STATES PATENT AND TRADEMARK OFFICE
CERTIFICATE OF CORRECTION

PATENT NO. : 10,167,786 B2
APPLICATION NO. : 15/127774
DATED : January 1, 2019
INVENTOR(S) : McTaggart-Cowan et al.

It is certified that error appears in the above-identified patent and that said Letters Patent is hereby corrected as shown below:

Please delete Pat. No. 10,167,786 B2 in its entirety and insert Pat. No. 10,167,786 B2 in its entirety as shown on the attached pages.

Signed and Sealed this
Fourteenth Day of May, 2019

Andrei Iancu
*Director of the United States Patent and Trademark Office*

(12) United States Patent
McTaggart-Cowan et al.

(10) Patent No.: US 10,167,786 B2
(45) Date of Patent: Jan. 1, 2019

(54) METHOD AND SYSTEM FOR OPERATING GASEOUS-FUELLED DIRECT INJECTION INTERNAL COMBUSTION ENGINE

(71) Applicant: Westport Power Inc., Vancouver (CA)

(72) Inventors: Gordon P. McTaggart-Cowan, Vancouver (CA); Kenneth R. Mann, Vancouver (CA); Jian Huang, Richmond (CA); Sandeep Munshi, Delta (CA)

(73) Assignee: WESTPORT POWER INC., Vancouver (CA)

(*) Notice: Subject to any disclaimer, the term of this patent is extended or adjusted under 35 U.S.C. 154(b) by 0 days.

(21) Appl. No.: 15/127,774

(22) PCT Filed: Mar. 19, 2015

(86) PCT No.: PCT/CA2015/050204
§ 371 (c)(1),
(2) Date: Sep. 20, 2016

(87) PCT Pub. No.: WO2015/139134
PCT Pub. Date: Sep. 24, 2015

(65) Prior Publication Data
US 2017/0130657 A1 May 11, 2017

(30) Foreign Application Priority Data
Mar. 21, 2014 (CA) .................... 2847630

(51) Int. Cl.
*F02D 19/02* (2006.01)
*F02D 35/02* (2006.01)
(Continued)

(52) U.S. Cl.
CPC ......... *F02D 19/022* (2013.01); *F02D 19/024* (2013.01); *F02D 35/023* (2013.01);
(Continued)

(58) Field of Classification Search
CPC ...... F02D 19/022; F02D 41/38; F02D 19/024; F02D 41/0027; F02D 41/0052;
(Continued)

(56) References Cited

U.S. PATENT DOCUMENTS

| | | | |
|---|---|---|---|
| 4,742,801 A * | 5/1988 | Kelgard | F02B 3/00 123/27 GE |
| 6,912,992 B2 | 7/2005 | Ancimer et al. | |

(Continued)

FOREIGN PATENT DOCUMENTS

| | | |
|---|---|---|
| CA | 2626995 | 7/2008 |
| CA | 2780864 C | 9/2013 |

(Continued)

OTHER PUBLICATIONS

Extended European Search Report in corresponding EP Application, dated Oct. 16, 2017.
(Continued)

*Primary Examiner* — Joseph Dallo
(74) *Attorney, Agent, or Firm* — Carie C. Mager

(57) ABSTRACT

A method for operating a gaseous-fuelled internal combustion engine by directly injecting the gaseous fuel into the combustion chamber is disclosed wherein the gaseous fuel is injected at injection pressures higher than 300 bar and the pressure ratio between the gaseous fuel injection pressure and the peak cylinder pressure is between 1.6:1 and 3:1, and preferably between 2.5:1 to 2.8:1. The injection pressure is selected to be between 300 and 540 bar and preferably between 300 bar and 440 bar. The injection pressure can be selected based on a preferred range for the pressure ratio.

19 Claims, 9 Drawing Sheets

(51) Int. Cl.

| | |
|---|---|
| F02B 43/00 | (2006.01) |
| F02D 41/40 | (2006.01) |
| F02D 41/00 | (2006.01) |
| F02D 41/38 | (2006.01) |
| F02M 21/02 | (2006.01) |
| F02D 41/14 | (2006.01) |

(52) U.S. Cl.

CPC ..... *F02D 41/0027* (2013.01); *F02D 41/0052* (2013.01); *F02D 41/38* (2013.01); *F02M 21/0275* (2013.01); *F02B 43/00* (2013.01); *F02D 41/0007* (2013.01); *F02D 41/1461* (2013.01); *F02D 41/401* (2013.01); *F02D 2041/389* (2013.01); *F02D 2250/31* (2013.01); *F02M 21/0218* (2013.01); *Y02T 10/32* (2013.01); *Y02T 10/47* (2013.01)

(58) Field of Classification Search

CPC .. F02D 35/023; F02D 41/401; F02D 41/0007; F02D 2250/31; F02D 2041/389; F02M 21/0275; F02M 21/0218; Y02T 10/32; F02B 43/00

See application file for complete search history.

(56) References Cited

U.S. PATENT DOCUMENTS

| | | |
|---|---|---|
| 7,090,145 B2 | 8/2006 | Baker et al. |
| 7,162,995 B2 | 1/2007 | Munshi |
| 7,188,470 B2 * | 3/2007 | Bosteels ............ B01D 53/9431 123/670 |
| 7,308,889 B2 | 12/2007 | Post et al. |
| 7,451,942 B2 | 11/2008 | Borissov |
| 7,463,967 B2 | 12/2008 | Ancimer et al. |
| 7,527,048 B2 | 5/2009 | Gillston et al. |
| 8,028,676 B2 | 10/2011 | Ancimer et al. |
| 8,095,294 B1 | 1/2012 | Griffiths et al. |
| 8,322,325 B2 | 12/2012 | Rogak et al. |
| 8,469,009 B2 | 6/2013 | Munshi et al. |
| 8,555,852 B2 | 10/2013 | Munshi et al. |
| 2006/0213488 A1 | 9/2006 | Post et al. |
| 2007/0245982 A1 * | 10/2007 | Sturman ................ F02B 21/00 123/26 |
| 2008/0264393 A1 * | 10/2008 | Sturman ................ F02B 9/04 123/568.14 |
| 2009/0120385 A1 * | 5/2009 | Munshi ................ C10L 3/06 123/3 |
| 2012/0160221 A1 * | 6/2012 | Munshi ................ C10L 3/06 123/575 |
| 2015/0219027 A1 * | 8/2015 | zur Loye ............ F02D 41/0027 60/603 |

FOREIGN PATENT DOCUMENTS

| | | |
|---|---|---|
| DE | 102009035579 A1 | 2/2001 |
| FR | 2897108 A1 | 8/2007 |
| JP | 2005344639 A | 12/2005 |
| WO | 2004101972 A1 | 11/2004 |

OTHER PUBLICATIONS

International Search Report and Written Opionion of the International Searching Authority, dated Jun. 10, 2015.

* cited by examiner

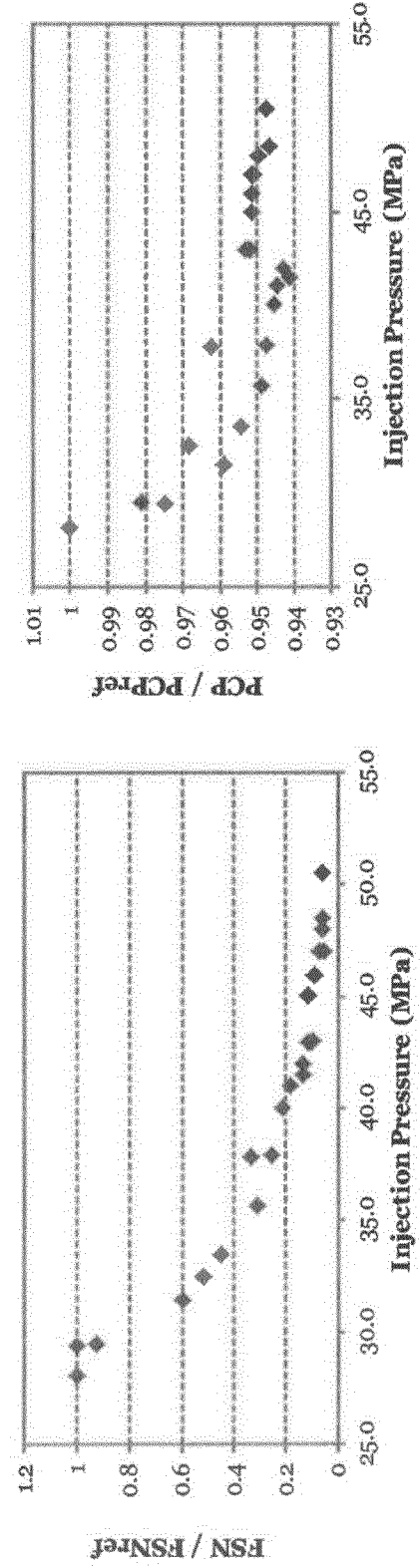
Figure 3A
Figure 3B
Figure 3C

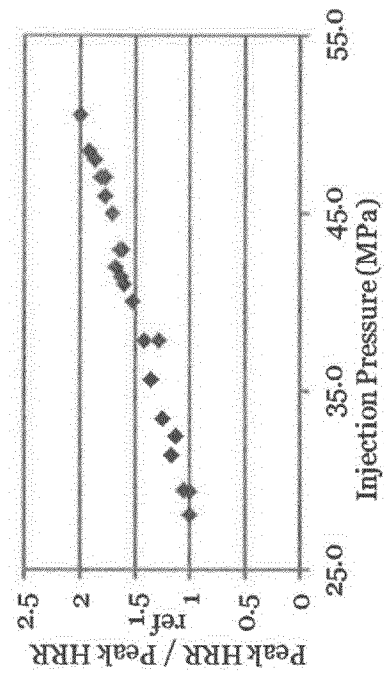
Figure 5B
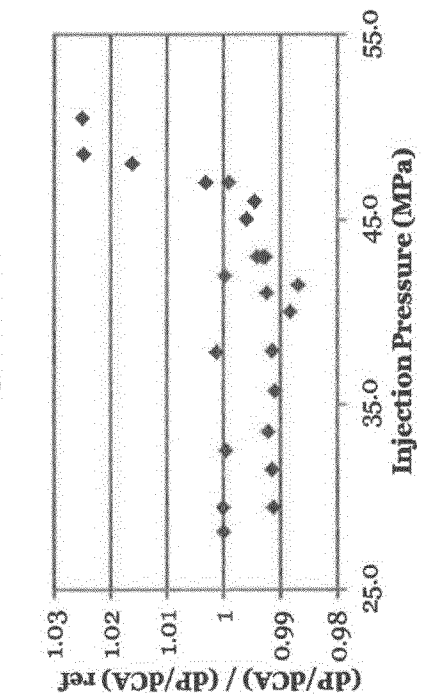
Figure 5D
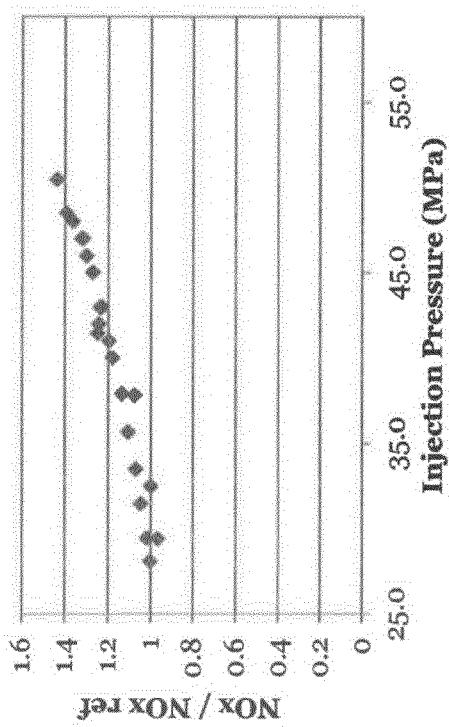
Figure 5A
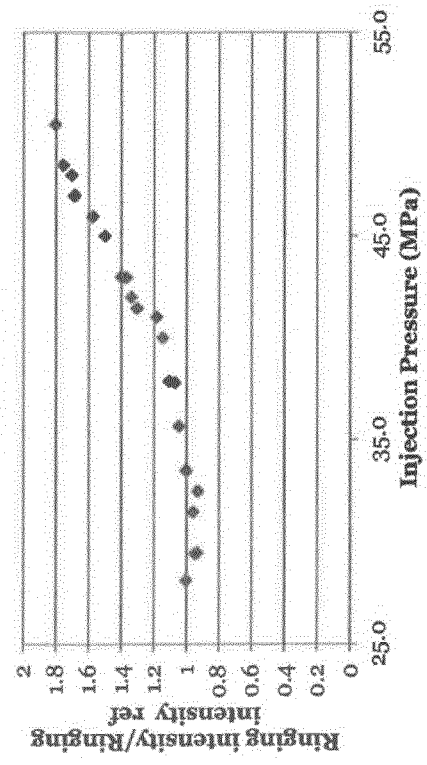
Figure 5C

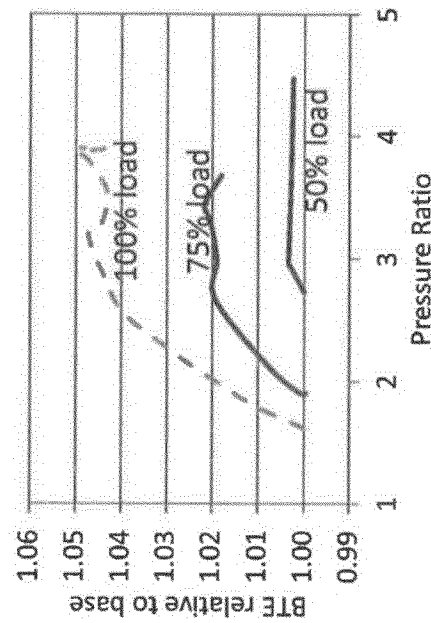
Figure 9B
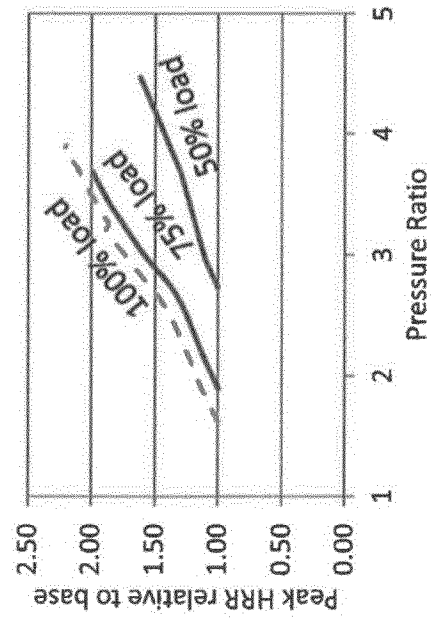
Figure 9D
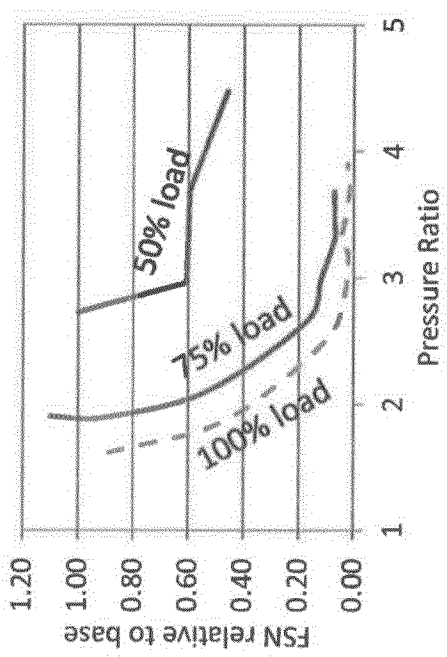
Figure 9A
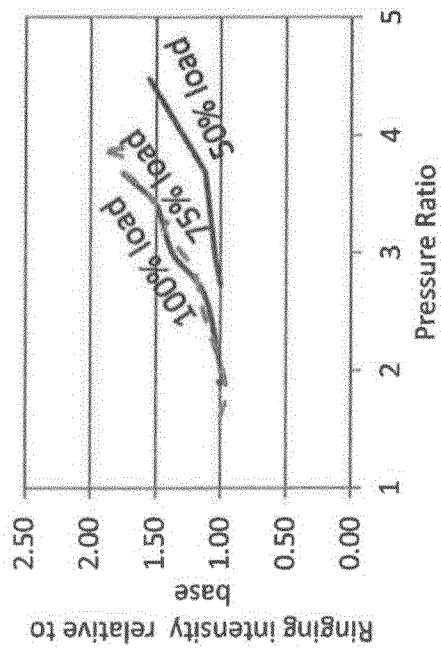
Figure 9C cavity located in the bottom region of the injector which surrounds the needle valve above the valve seat. As illustrated in applicant's U.S. Pat. Nos. 7,527,048 and 7,090,145 or in Canadian patent no. 2780864 the fuel cavity is supplied with fuel from a common rail through a fuel inlet. In these designs, the pressure of the gaseous fuel in the plenum of the injector, hence the injection pressure is substantially the same as the gas rail pressure. In other injector designs, fuel is supplied from the common rail to the injector at a lower pressure and the pressure of the fuel is increased to the desired pressure for injection into the combustion chamber by an intensifier located in the injector body. In these designs, the injection pressure which is the pressure in the plenum of the injector is generally higher than the gas rail pressure.

For engines equipped with an exhaust gas recirculation system, the method further comprises detecting the NOx emissions generated by operating the engine and increasing the amount of exhaust gas recirculated to the engine intake whereby the NOx emissions are maintained below a maximum predetermined level.

The gaseous fuel injection pressure can be determined based on the fuel delivery parameter which is defined as a function of a predetermined static flow rate for the gaseous fuel through an injector nozzle and a predetermined engine power per cylinder. In the present disclosure, the fuel delivery parameter is preferably in the range between 0.45 and 0.6.

In the present method the injection pressure and the orientation of the jet of gaseous fuel injected in the combustion chamber is determined such that the jet is impinging on at least one surface of the piston within the combustion chamber. The orientation of the gaseous fuel jet when it is injected into the combustion chamber depends, for example, on the injection angle and on the positioning of the injector nozzle within the combustion chamber.

A gaseous-fuelled direct injection internal combustion engine comprises a combustion chamber, a gaseous fuel injector for injecting an amount of gaseous fuel directly into the combustion chamber, an intake air system for introducing an amount of air into the combustion chamber and an exhaust gas system comprising an exhaust gas line in communication with the combustion chamber. The internal combustion engine also comprises a controller programmed to control the injection pressure of the gaseous fuel to a pressure higher than 300 bar and having a value determined as a function of the pressure ratio between the injection pressure of the gaseous fuel and the peak cylinder pressure, wherein the pressure ratio is between 1.6:1 and 3:1. The engine further comprises an ignition assist device to help ignite the gaseous fuel. In some embodiments, the engine comprises a pilot fuel injector for introducing an amount of pilot fuel directly into the combustion chamber, wherein the pilot fuel assists with ignition of the gaseous fuel, or the pilot fuel can be injected by a dual fuel injector which can inject both the gaseous fuel and the pilot fuel directly into the combustion chamber. In other embodiments other well-known ignition assist devices such as hot surfaces (e.g. glow plugs), spark plugs and catalytic elements can be employed instead of, or in conjunction with a pilot fuel.

In preferred embodiments the pressure ratio between the injection pressure of the gaseous fuel and the peak cylinder pressure is between 2.5:1 and 2.8:1. For some engines the most benefits in engine efficiency and reduced particulate matter emissions are achieved when the injection pressure is higher than 300 bar and less than around 540 bar, and preferably less than 440 bar.

The gaseous fuel injector has a nozzle having holes through which gaseous fuel is injected into the combustion chamber and the diameter of the holes is calculated based on a fuel delivery parameter which is a function of the gaseous fuel injection pressure and a predetermined engine power per cylinder. In preferred embodiments the fuel delivery parameter has a value in the range between 0.45 and 0.6.

BRIEF DESCRIPTION OF THE DRAWINGS

The drawings illustrate specific preferred embodiments of the apparatus and the experimental results of the present method, but should not be considered as restricting the spirit or scope of the invention in any way.

FIG. 1 is a schematic view of a direct injection gaseous-fuelled internal combustion engine system that can be used to practice the disclosed method;

FIG. 2 is a schematic view of a direct injection gaseous-fuelled internal combustion engine system comprising an exhaust after-treatment subsystem and an exhaust gas recirculation loop;

FIGS. 3A, 3B and 3C show the graphs illustrating the values of the filter smoke number, the peak cylinder pressure and respectively the turbine inlet temperature which were recorded when operating a gaseous-fuelled internal combustion system of the present disclosure at different injection pressures and such values are represented relative to the respective reference values for these parameters recorded for a 15 liter test engine at an injection pressure of 28.5 MPa;

FIG. 4 shows a graph illustrating the values for the engine power and thermal efficiencies values recorded when operating a gaseous-fuelled direct injection engine at different injection pressures where the thermal efficiency values are represented relative to a baseline engine operating condition;

FIGS. 5A to 5D show the graphs illustrating the measured values for NOx, peak heat release rate, ringing intensity and peak rate of cylinder pressure rise which were recorded when operating the present gaseous-fuelled internal combustion engine at different injection pressures and these values are represented relative to their reference values recorded for an injection pressure of 28 MPa;

FIG. 6 shows the steps of a method of increasing the gaseous fuel injection pressure and adjusting the exhaust gas recirculation level to control the NOx emissions while optimizing the brake specific fuel consumption value.

FIG. 7 shows a graph illustrating the estimated thermal efficiency for a gaseous-fuelled internal combustion engine of the present disclosure as a function of the filter smoke number (FSN) for different injection pressures, where these parameters are represented relative to a baseline engine operating condition;

FIG. 8 shows a graph illustrating the values of the fuel delivery parameter for different cylinder power values, for different injection pressures and for different injector nozzle designs of a gaseous-fuelled internal combustion engine disclosed here; and FIGS. 9A to 9D show graphs illustrating the recorded values of the filter smoke number, engine thermal efficiency, ringing intensity and peak heat release rate relative to the respective values for a baseline engine operating condition when operating a gaseous-fuelled engine of the present disclosure at different pressure ratios and in different engine operating modes.

DETAILED DESCRIPTION OF THE PREFERRED EMBODIMENTS

Referring to FIG. 1, internal combustion engine system 100 shows an illustrative embodiment of a direct injection gaseous-fuelled engine. In this example, the system stores the gaseous fuel as a liquefied gas in gas storage tank 111 and injects the gaseous fuel directly into the combustion chamber through fuel injection valve 141. In this embodiment a pilot fuel that is more readily ignited compared to the main gaseous fuel is injected through the fuel injection valve 141 to assist with ignition of the gaseous fuel. In other embodiments (not illustrated) other well-known ignition assist devices such as hot surfaces (e.g. glow plugs), spark plugs and catalytic elements can be employed instead of, or in conjunction with a pilot fuel. The manner in which the gaseous fuel is stored is not important for the disclosed method, and the gaseous fuel can be stored in a pressure vessel as a compressed gas, or for a stationary application the fuel can be delivered from a pipeline and compressed to the needed pressure. In the illustrated figure, the fuel is stored as liquefied natural gas (LNG), pressurized to a desired pressure and then vaporized to be delivered in gaseous form to the fuel injector.

Internal combustion engine system 100 generally comprises gaseous fuel delivery subsystem 110, pilot fuel delivery subsystem 120, fuel injection subsystem 140, and controller 150. Each of these subsystems is described in more detail below.

Gaseous fuel delivery subsystem 110 comprises storage tank 111, pump 112, gaseous fuel supply line 113, vaporizer 114, accumulator vessel 115, gaseous fuel rail 116, gaseous fuel rail pressure sensor 117, and pressure regulating valve 118. For engines used to power vehicles, space on-board the vehicle for carrying fuel can be limited so it is desirable to store gaseous fuels in liquefied form at cryogenic temperatures because this increases the energy density of the fuel, reducing the storage volume. Pump 112 is shown with a suction inlet disposed inside the cryogenic space of storage tank 111, and the working chamber of pump 112 can also be immersed in the cryogenic space, with a drive shaft extending therefrom and connected to a drive unit disposed outside the cryogenic space, or the working chamber of pump 112 can be completely external to storage tank 111, with a thermally insulated pipe connecting the pump to the storage tank. In some embodiments, a booster compressor 119, with an outline shown in FIG. 1 by dashed lines, can be provided on the gaseous fuel line to further increase the pressure at which the gaseous fuel is delivered to the fuel injector. The disclosed method could also work with the gaseous fuel stored in a gaseous form, for example as compressed natural gas (CNG), stored in a pressure-rated vessel.

Pilot fuel delivery subsystem 120 comprises storage tank 121, metering valve 122, pump 123, pilot fuel rail 124, check valve 125, pilot rail pressure sensor 126, and pilot fuel line 127. In the illustrated embodiment, metering valve 122 controls pilot fuel pressure in pilot fuel rail 124 by controlling the quantity of pilot fuel that is delivered to pump 123. Pilot fuel line 127 dead-ends at the control chamber of pressure regulating valve 118 thereby operating a valve member in pressure regulating valve 118 to control the fuel pressure in gaseous fuel rail 116 as a function of the pilot fuel pressure in pilot fuel rail 124. Through this arrangement gaseous fuel pressure is controlled through pilot fuel pressure. The present method can also be employed in systems comprising other arrangements for separately controlling the pilot fuel rail pressure and the gaseous fuel rail pressure or arrangements that control pilot fuel pressure as a function of gaseous fuel pressure.

In preferred embodiments, the engine system illustrated in FIG. 1 is employed by a multi-cylinder engine with gaseous fuel supply rail 116 delivering fuel to a plurality of fuel injection valves, but to simplify the illustration of the apparatus, only one fuel injection valve and one combustion chamber is shown.

Fuel injection valve 141 injects the fuel directly into combustion chamber 142, which is defined by cylinder 143, piston 144 and cylinder head 148. Intake valve 145 opens during the intake stroke to allow an intake charge to be induced into combustion chamber 142. Intake valve 145 is otherwise closed. The intake charge can comprise only air or air and recirculated exhaust gas if the engine is equipped with an exhaust gas recirculation system as further shown in FIG. 2. During the intake stroke exhaust valve 146 stays closed.

As shown in FIG. 1 by dashed data communication lines, controller 150 communicates with a number of components to receive measured engine parameters from sensors, such as for example, gaseous fuel rail pressure and pilot fuel rail pressure, and to send signals to actuators of engine components, such as for example fuel injection valve 141, pump 112 and pump 123. Controller 150 can be the engine controller itself or it can be a separate controller that interacts with a conventional diesel engine controller used by the engine before being modified to operate with gaseous fuel as the primary fuel. While instrumentation exists to measure cylinder pressure directly, such instrumentation is expensive, more suited to research purposes and is not considered economical, practical and reliable enough for large-volume commercial use. Therefore, cylinder pressure during an injection event is typically approximated by reconstruction from indirect measurements of parameters that correlate to cylinder pressure such as the intake manifold pressure and temperature, exhaust manifold pressure, engine speed and the timing for start of injection. In the present disclosure, test results are illustrated as a function of the injection pressure which is defined herein as the pressure of the fuel in the plenum cavity of the injector and as a function of the ratio between injection pressure and cylinder pressure.

When controller 150 interacts with a conventional diesel engine controller, controller 150 can receive input data from the diesel engine controller such as, by way of example, the timing for start of injection, the fuelling amount, and other input data indicating values associated with a parameter indicative of an engine operation state, such as for example engine speed.

The engine system illustrated in FIG. 1 can further comprise additional equipment such as an exhaust gas after-treatment system for further controlling the vehicle emissions. Such an after-treatment system is illustrated in FIG. 2 which shows a schematic view of a direct-injection gaseous-fuelled internal combustion engine system comprising an exhaust after-treatment subsystem and an exhaust gas recirculation loop. Internal combustion engine system 200 generally comprises engine 230, gaseous fuel delivery subsystem 210, diesel fuel delivery subsystem 220, and controller 250. The engine system further comprises air intake line 231 and exhaust gas line 232. Some of the exhaust gas exiting the engine in direction 233 is directed through exhaust gas recirculation loop 234 in direction 235 and through valve 236 into air intake line 231 where it is mixed with intake air flowing through air intake line 231. The mix of fresh intake air and recirculated exhaust gas is delivered to the intake ports of engine 230 in the direction shown by arrow 237. The exhaust gas exiting engine 230, which is not recirculated, flows in direction shown by arrow 238 through the turbine of turbocharger 239 and on to line 240 which is connected to exhaust gas after-treatment subsystem 260 and from there the exhaust gas is released into the atmosphere through the exhaust pipe 266. Turbocharger 239 preferably has a variable geometry as known in to those skilled in this technology.

In the illustrated embodiment, exhaust gas after-treatment subsystem 260 comprises selective catalytic reduction (SCR) converter 261, urea injection system 262, particulate filter 263 (known as a "DPF") and diesel fuel injector 264. DPF 263 may comprise a diesel oxidation catalyst device for oxidizing the hydrocarbons and carbon monoxide within the exhaust gas.

Such exhaust after-treatment systems as the one illustrated in FIG. 2 can be expensive and add to the overall cost of the engine systems. Therefore it would be desirable to reduce the engine emissions, in particular the particulate matter emissions, to preferably eliminate the after-treatment system or to replace it with lower cost alternatives. NOx sensors 265 and 267 and particulate matter sensor 268 can be placed in the engine exhaust for detecting the engine's NOx and respectively particulate matter emissions.

It has been found that for engine systems such as the ones illustrated in FIGS. 1 and 2 a considerable reduction in the FSN (filter smoke number) of up to 90% can be achieved by increasing the injection pressure above 30 MPa (300 bar). The filter smoke number (FSN) is considered to be an indicator that is directly correlated with the engine particulate matter emissions. These results are illustrated in FIG. 3A which shows a decreasing trend for the ratio between the filter smoke number (FSN) and the reference filter smoke number ($FSN_{ref}$). As shown in FIG. 3A the filter smoke number is reduced compared to the reference filter smoke number for injection pressures over 30 MPa (300 bar), especially for injection pressures between 30 MPa and around 45 MPa. The illustrated results have been obtained for a conventional 15 liter direct injection gaseous-fuelled engine operated at a speed of 1500 RPM and a torque of 2400 N·m. In FIG. 3A FSN represents the filter smoke numbers measured when the engine was operating at different injection pressures and $FSN_{ref}$ represents the filter smoke number for a base fuelling condition of the tested engine at an injection pressure of around 28.5 MPa (285 bar).

The tests conducted on the sample engine at injection pressures higher than 300 bar, illustrated in FIG. 3A, show different results than the results described in the prior art, for example in U.S. Pat. No. 8,091,536, which were obtained by operating an internal combustion engine fuelled with a mixture of hydrogen and methane at different pressure ratios of up to 3:1, with different combustion timings and at pressures of up to 300 bar. The tests in the cited prior art, which were conducted at an engine speed of 800 RPM and low load, concluded that higher injection pressures resulted in slightly increased levels of particulate matter compared to engines fuelled with the same gaseous fuel mixture but with lower injection pressures.

As further illustrated in FIGS. 3B and 3C it was also observed that peak cylinder pressure (PCP) and turbine inlet temperature (Turb. Inlet T.) decrease at increased injection pressures compared to the respective values of these parameters for a reference injection pressure of 28.5 MPa (285 bar). This was demonstrated for the same 15 liter test engine and under the same engine operating conditions (engine speed of 1500 RPM and torque of 2400 N·m). The ratio between the peak cylinder pressure (PCP) at different injection pressures and a reference value for the peak cylinder pressure for an injection pressure of 28.5 MPa ($PCP_{ref}$), illustrated in FIG. 3B, showed a decreasing trend, with a more noticeable difference for injection pressures between 300 and 440 bar. A similar decreasing trend was observed for the ratio between the measured turbine inlet temperatures (Turbo. Inlet T.) and a reference value (Turbo.Inlet T. ref) for the turbine inlet temperature measured for an injection pressure of 28 MPa as illustrated in FIG. 3C. Since peak cylinder pressure is a parameter that limits the advancing of combustion within the combustion chamber and turbine inlet temperature is a parameter that limits how late in an engine cycle the combustion can be delayed, the results illustrated in FIGS. 3B and 3C show positive effects that allow a more flexible combustion phasing strategy for a direct injection gaseous-fuelled engine operated at injection pressures higher than 300 bar. The tests illustrated here have taken into consideration the turbine inlet temperature because the tested engine system also included a turbocharger comprising a turbine installed in the exhaust system to use the enthalpy in the exhaust to drive a compressor which increases the intake air pressure, but in other systems that do not use a turbocharger the data shown in FIG. 3C corresponds to the temperature of the exhaust gas leaving the engine's exhaust manifold.

The results of the tests conducted as described above also show that there are diminishing benefits in terms of reduced FSN, reduced peak cylinder pressure and reduced turbine inlet temperature by increasing the injection pressure above 45 MPa (450 bar), and more specifically above 44 MPa (440 bar). Because there are parasitic losses associated with increasing injection pressure, the experimental data shows that there is an upper limit to the desirable range of gaseous fuel injection pressure.

In the tested engines, for all the test results illustrated in the present disclosure, the injector did not comprise an intensifier and therefore the injection pressure was substantially the same as the gas rail pressure. It would be understood that the same test results and preferred values for the injection pressures and the pressure ratios discussed herein would apply to engines using an injector which comprises an intensifier.

The positive effects of increasing the gaseous fuel injection pressures on the peak cylinder pressure and on the turbine inlet temperature or the exhaust gas temperature allow a more flexible combustion phasing strategy, which allows the advance and/or delay of the combustion timing while increasing the fuel injection quantity which means that the engine can generate more power. The higher injection pressure increases both the fuel injection rate and the combustion rate which allows a higher efficiency for a given power including an increase in efficiency at maximum power. The effect of the injection pressure increase on the engine's thermal efficiency and engine power is shown in FIG. 4 which illustrates the thermal efficiency relative to the baseline thermal efficiency as a function of engine power for three different injection pressures at an engine speed of 1750 RPM, with a fixed EGR rate of around 12% for a 15 liter engine with a maximum power rating of 356 kW. The baseline thermal efficiency is the thermal efficiency for a conventional 15 liter direct injection gaseous-fuelled engine operated at a speed of 1500 RPM and a torque of 2400 N·m. This data also shows that increasing the gaseous fuel injection pressure to about 500 bar does not show a significant benefit over operating the engine with an injection pressure of about 400 bar again showing that there is a desirable range of gaseous fuel injection pressure which has upper and lower limits.

During the tests conducted on a 15 liter gaseous-fuelled direct injection internal combustion engine operated at an engine speed of 1500 RPM and a torque of 2400 N·m, with a fixed air supply, EGR and fuel flow rate it has been observed that the NOx emissions, the peak heat release rate and the ringing intensity also tend to increase beyond the applicant's acceptable levels at injection pressures over around 440 bar, as illustrated in FIGS. 5A, 5B and 5C. FIG. 5A illustrates the measured NOx emissions relative to a reference NOx emission value, FIG. 5B illustrates the peak heat release rate (HRR) relative to a peak heat release rate reference value and FIG. 5C illustrates the estimated ringing intensity relative to an estimated reference value for the ringing intensity. The ringing intensity is a parameter indicative of the combustion noise level and is a function of the pressure oscillations in the combustion chamber. All tests were conducted for a 15 liter gaseous-fuelled direct injection engine at an engine speed of 1500 RPM and a torque of 2400 N·m with a fixed air supply rate, EGR rate and fuel flow rate. The reference values for the NOx emissions, the peak heat release rate and the estimated ringing intensity were recorded for the engine operating at around 28 MPa (280 bar) injection pressure.

Even though an increase in heat release rate and ringing intensity could be expected when increasing the injection pressure over 300 bar, it was also found that the peak rate of cylinder pressure rise (dP/dCA) which is a common measure of potential for increased engine wear did not increase for gas rail pressures higher than 280 bar until the gas rail pressure reached around 48 MPa (480 bar). FIG. 5D illustrates a graph showing the values of the ratio between the peak rate of cylinder pressure rise (dP/dCA) and the reference value for the peak rate of cylinder pressure rise $(dP/dCA)_{ref}$. These results align with the aforementioned results to teach that, for the subject engine, a preferred range for the gaseous fuel injection pressure is between 300 bar to around 440 bar.

Since the results show an increase in NOx emissions when operating the engine at injection pressures higher than 300 bar the method of operating the engine comprises steps to lower such emissions. For engines employing exhaust gas recirculation loops such as the one illustrated in FIG. 2 one method of maintaining NOx emissions within acceptable levels is to increase the exhaust gas recirculation level and to adjust the operation of turbocharger 239 to maintain an appropriate air flow. As illustrated in FIG. 6, in a first step of the method gaseous fuel injection pressure is increased to a predetermined level to reduce the particulate matter emissions and in the next step the exhaust gas recirculation level is increased to control the NOx emissions. The turbocharger operation is then adjusted to maintain an appropriate air flow. In a further step, the gaseous fuel injection timing is adjusted to optimize the brake specific fuel consumption (BSFC) and the exhaust gas recirculation (EGR) amount is adjusted to maintain the NOx emissions within predetermined limits. The NOx emissions can be detected by the NOx sensors 265 and 267 illustrated in FIG. 2, for example. The steps of adjusting the air flow to maintain an appropriate air flow, adjusting the gaseous fuel injection timing and adjusting the exhaust gas recirculation amount are repeated to maintain a predetermined level of NOx emissions while optimizing the brake specific fuel consumption and engine thermal efficiency.

This method was applied to an engine operating at a speed of 1500 RPM and at a torque of 2400 N·m and the injection timing was varied from the most advanced timing corresponding to the peak cylinder pressure (PCP) limit to the most retarded timing while maintaining the exhaust gas temperature below 690 degrees C. Experimental data showed that it was possible to increase exhaust gas recirculation to a level that maintained the NOx emissions at 1.2 g/kWh. The results regarding the engine efficiency and particulate matter emissions when operating with an increased EGR rate are shown in FIG. 7 which illustrates the relationship between thermal efficiency and filter smoke number (FSN) for different injection pressures, wherein both the thermal efficiency and the filter smoke number are represented relative to the respective values of the thermal efficiency and FSN for a baseline engine condition, more specifically for the values of the thermal efficiency and FSN recorded for a conventional 15 liter direct injection gaseous-fuelled engine operated at a speed of 1500 RPM and a torque of 2400 N·m. The results demonstrate that increasing the gaseous fuel injection pressure over 34 MPa (340 bar) improves the particulate matter emissions (FSN) and engine efficiency and also show that the benefits of operating at injection pressures higher than 44 MPa (440 bar) are limited for this engine operating condition. Similar results have been observed for other engine operating modes.

For engines that do not use exhaust gas recirculation, other methods can be used to control the increase in NOx emissions due to operating at higher injection pressures, for example through different combustion phasing strategies such as techniques for delaying combustion, closer to the end of the compression stroke or by changing the operation of the exhaust gas treatment devices.

It is known that the density of gaseous fuel, for example of natural gas, increases with pressure, and therefore in order to deliver the same amount of fuel in the same amount of time, a higher pressure engine system would require a lower volumetric flow rate through the injection valves. This allows the gaseous fuel nozzle to have holes with a reduced diameter compared to a more conventional nozzle that injects fuel at lower injection pressures (up to 300 bar). Having holes with a reduced diameter compared to the conventional nozzle is an advantage because it allows a higher surface to volume ratio for the jet of gaseous fuel being injected into the combustion chamber which promotes a better gaseous fuel/air mixture.

To provide guidance in selecting the appropriate nozzle diameter for an engine a non-dimensional parameter, the fuel delivery parameter (FDP), illustrated in the formula (1) below, was created:

$$\text{Fuel delivery parameter} = \text{Gaseous Fuel Injection Pressure} * \text{Static Gas Flow} / \text{Engine Power Per Cylinder}, \quad (1)$$

where the static gas flow is the static flow rate through the injector nozzle, which is a manufacturing parameter defined on the basis of air flow through the nozzle at an air supply pressure of 15 psi, 60 degrees Celsius and with zero backpressure and the engine power per cylinder is the rated engine power divided by the number of firing cylinders.

Tests were conducted on commercially available gaseous-fuelled direct injection engines, with respective power ratings of 300-356 kW and 457 kW provided with regular injection nozzles ("base") and, alternatively, with low flow injection nozzles (LF), or high flow nozzles (HF), more specifically with nozzles having a diameter reduced by around 30% compared to the conventional injector nozzle holes for the low flow nozzles and respectively having a diameter increased by around 15% compared to the conventional injector nozzle holes for the high flow nozzles. The results are shown in FIG. 8 which represents the fuel delivery parameter as a function of the cylinder power. It was found that for an engine having regular sized injection nozzles holes the FDP was in the range of 0.45 to 0.6 when the engine was operating at an injection pressure of 29 MPa (290 bar) and that the FDP stayed within the same range of values for the engine employing the low flow nozzles when operating at injection pressures of up to 50 MPa (500 bar), whereby the same amount of fuel is injected into the combustion chamber at higher pressures, which avoids a harsh combustion rate and noisier engine operation.

Based on the above findings a method for determining the injector nozzle hole geometry was determined. The first step of the method is determining the power requirement and the peak cylinder pressure for each engine cylinder. The desired gaseous fuel injection pressure is then calculated as function of the peak cylinder pressure, such that the ratio between the injection pressure and the peak cylinder pressure is maintained for example between 2.5:1 and 2.8:1, as further explained below. The injector static gas flow can then be determined based on a desired fuel delivery parameter in the range of between 0.45 and 0.6 and the nozzle hole diameter can be calculated based on the determined injector static gas flow.

As discussed above, it was found that an injection pressure higher than 300 bar results in lower particulate matter emissions and more engine power and efficiency and that injection pressures in the range of 300 to 440 bar have yielded the most benefits. It was found that such results regarding the injection pressure are influenced by the peak cylinder pressure rating which varies depending on the engine model. It was also found that for all engine types and models, at gaseous fuel injection pressures higher than 300 bar, the pressure ratio between the gaseous fuel injection pressure and the peak in-cylinder pressure is the factor that influences the rate at which fuel is introduced into the combustion chamber and the fuel mixing within the combustion chamber.

The tests conducted on a gaseous-fuelled direct injection internal combustion engine show that most of the benefits regarding engine efficiency and reduced emissions can be achieved by operating the engine with an injection pressure that corresponds to a pressure ratio between 1.6:1 to 3.0:1. The results of the tests conducted on an engine operating at a speed of 1490 RPM, using nozzles with a hole diameter reduced by around 30% compared to conventional nozzle holes, at different loads (50% load, 75% load and 100% load) are shown in FIGS. 9A to 9D which illustrate the filter smoke number (FSN), the brake thermal efficiency (BTE), the ringing intensity and respectively the peak heat release rate (HRR) as a function of the pressure ratio PR (the ratio between the injection pressure and the peak cylinder pressure). The values of the FSN, the BTE, the ringing intensity and the HRR are represented relative to the respective values of these parameters recorded for baseline engine operating condition (285 bar injection pressure, engine speed of 1500 RPM and engine load of 2400 N·m). Similar tests were conducted on an engine having regular sized injector nozzle holes and similar results were found. These results show that there are no further benefits in either emission reduction or in engine efficiency for PR values over 3:1 and that the majority of the benefits in FSN reduction, and brake thermal efficiency are achieved at pressure ratios between 1.6:1 and 3:1 and preferably between 2.5:1 and 2.8:1. As illustrated in FIGS. 9C and 9D, lower PR values, such as PR values between 2.5:1 and 2.8:1, lead to lower increases in ringing intensity and peak heat release rate, which are beneficial for engine noise and durability. For PR values higher than 3.5:1 some modes of operation showed a penalty in engine efficiency. For some gaseous fuelled internal combustion engines, a PR value of 3:1 generally corresponds to an injection pressure of around 540 bar and therefore for these engines most of the benefits described here will be achieved by operating the engine at injection pressures lower than around 540 bar. For other engine types, injection pressures higher than 540 bar can be employed to achieve the preferred range of pressure ratios presented above.

Based on the above teachings a method for selecting a gaseous fuel injection pressure, at any engine condition for a given engine type and model has been developed. The pressure ratio between the gaseous fuel injection pressure and the peak cylinder pressure at that condition is selected to be within the preferred range, for example between 2.5:1 to 2.8:1, and the desired gaseous fuel injection pressure is calculated based on the identified peak cylinder pressure. The calculated gaseous fuel injection pressure is compared to the range of values for the gaseous fuel injection pressure calculated based on a fuel delivery parameter between 0.45 and 0.6, according to formula (1) and the value for the gaseous fuel injection pressure is adjusted such that it is in the range of values between the injection pressure for the lowest fuel delivery parameter and the injection pressure for the highest fuel delivery parameter.

During all the tests conducted on gaseous-fuelled direct injection internal combustion engines operating at injection pressures higher than 300 bar it was found that a better mixing and greater efficiency can be obtained if the gaseous fuel jet impinges on the cylinder piston. This is different than the prior art described for example in the U.S. Pat. No. 7,162,995 where the engine operates with pressure ratios greater than 2:1 but where the gas injection pressure avoids the gas jet interference with the cylinder piston. The gaseous fuel jet penetration and impingement on the cylinder piston in the present method are a function of the momentum of the gas jet and the density of the cylinder charge. Higher injection pressures, even when using nozzle injection holes with smaller diameter, increase the gas jet penetration which also depends on the orientation of the jet of the gaseous fuel, the design of the piston and of the combustion chamber (e.g. bowl features, bowl diameter) and the injection timing. The orientation of the gaseous fuel jet when it is injected into the combustion chamber depends, for example, on the injection angle and on the positioning of the injector nozzle within the combustion chamber. All these factors are taken in consideration in the current injection strategy in order to achieve a jet penetration that will allow an interference of the jet with a surface of the cylinder piston. This is more important at higher pressures where a good mixing between the charge in the combustion chamber and the injected gaseous fuel is more restricted which can result in poor air utilization and possibly delayed or incomplete burning of the fuel.

While particular elements, embodiments and applications of the subject method and apparatus have been shown and described, it will be understood, that the invention is not limited thereto since modifications can be made by those skilled in the art without departing from the scope of the present disclosure, particularly in light of the foregoing teachings.

We claim:

1. A method of operating a gaseous-fuelled direct injection internal combustion engine, the method comprising injecting said gaseous fuel directly into a combustion chamber at an injection pressure higher than 300 bar wherein an orientation of a jet of said gaseous fuel is determined such that said jet is impinging on at least one surface of a cylinder piston and a ratio between said injection pressure and a peak cylinder pressure is between 1.6:1 and 3:1.

2. The method of claim 1 wherein said injection pressure is higher than 340 bar.

3. The method of claim 2 wherein said injection pressure is less than 540 bar.

4. The method of claim 1 wherein the injection pressure is determined as a function of injector nozzle hole geometry and a predetermined engine power per cylinder.

5. The method of claim 1 wherein said injection pressure is less than 440 bar.

6. The method of claim 1 wherein said injection pressure is determined based on a fuel delivery parameter which is a function of a predetermined static flow rate for said gaseous fuel through an injector nozzle and a predetermined engine power per cylinder.

7. The method of claim 6 wherein said fuel delivery parameter is a non-dimensional parameter determined by multiplying injection pressure of said gaseous fuel by said predetermined static flow rate divided by a predetermined engine power per cylinder and has a value in the range between 0.45 and 0.6.

8. The method of claim 1 wherein said injection pressure is less than 540 bar.

9. The method of claim 8 wherein said injection pressure is determined based on a fuel delivery parameter which is a function of a predetermined static flow rate for said gaseous fuel through an injector nozzle and a predetermined engine power per cylinder.

10. The method of claim 9 wherein said fuel delivery parameter is a non-dimensional parameter determined by multiplying injection pressure of said gaseous fuel by said predetermined static flow rate divided by a predetermined engine power per cylinder and has a value in the range between 0.45 and 0.6.

11. A gaseous-fuelled direct injection internal combustion engine comprising:
   a. a combustion chamber,
   b. a gaseous fuel injector having a nozzle with holes for injecting an amount of gaseous fuel directly into said combustion chamber at an injection pressure;
      said holes having a diameter sized as a function of said injection pressure of said gaseous fuel and a predetermined engine power per cylinder,
   c. an intake air system for introducing an amount of air into said combustion
   d. an exhaust gas system comprising an exhaust gas line in communication with said combustion chamber, and
   e. a controller programmed to control said injection pressure of said gaseous fuel to a pressure higher than 300 bar and having a value determined as a function of a ratio between said injection pressure and a peak cylinder pressure, wherein said ratio is between 1.6:1 and 3:1.

12. The engine of claim 11 having said controller programmed to control said injection pressure of said gaseous fuel to a pressure higher than 340 bar.

13. The engine of claim 12 wherein said injection pressure of said gaseous fuel is less than 540 bar.

14. The engine of claim 11 wherein said injection pressure of said gaseous fuel is less than 540 bar.

15. The engine of claim 11 wherein said injection pressure of said gaseous fuel is less than 440 bar.

16. The engine of claim 11 wherein the diameter of said holes is calculated based on a fuel delivery parameter which is a non-dimensional parameter determined by multiplying injection pressure of said gaseous fuel by said predetermined static flow rate divided by a predetermined engine power per cylinder and said fuel delivery parameter has a value in the range between 0.45 and 0.6.

17. A method of operating a gaseous-fuelled direct injection internal combustion engine, the method comprising injecting said gaseous fuel directly into a combustion chamber at an injection pressure between 340 and 540 bar wherein a ratio between said injection pressure and a peak cylinder pressure is between 1.6:1 and 3:1.

18. The method of claim 17 wherein the injection pressure is determined as a function of an injector nozzle hole geometry and a predetermined engine power per cylinder.

19. The method of claim 17 wherein said injection pressure is determined based on a fuel delivery parameter which is a function of a predetermined static flow rate for said gaseous fuel through an injector nozzle and a predetermined engine power per cylinder.

* * * * *